(12) United States Patent
Lin et al.

(10) Patent No.: US 8,243,289 B2
(45) Date of Patent: Aug. 14, 2012

(54) SYSTEM AND METHOD FOR DYNAMIC WINDOWING

(75) Inventors: Chengchih Lin, Ann Arbor, MI (US); Craig A. Manning, Farmington Hills, MI (US); Shyam P. Keshavmurthy, Ann Arbor, MI (US)

(73) Assignee: Perceptron, Inc., Plymouth, MI (US)

( * ) Notice: Subject to any disclaimer, the term of this patent is extended or adjusted under 35 U.S.C. 154(b) by 134 days.

(21) Appl. No.: 12/797,083

(22) Filed: Jun. 9, 2010

(65) Prior Publication Data

US 2010/0302558 A1 Dec. 2, 2010

Related U.S. Application Data

(63) Continuation-in-part of application No. 12/474,911, filed on May 29, 2009, now Pat. No. 8,031,345.

(51) Int. Cl.
*G01B 11/14* (2006.01)

(52) U.S. Cl. ........ 356/623; 356/607; 356/620; 356/614; 250/559.22

(58) Field of Classification Search .......... 356/600–624; 250/559.2, 548; 382/203–206, 151, 154
See application file for complete search history.

(56) References Cited

U.S. PATENT DOCUMENTS

| | | | |
|---|---|---|---|
| 4,188,544 A * | 2/1980 | Chasson | 250/559.06 |
| 4,846,577 A | 7/1989 | Grindon | |
| 4,867,570 A | 9/1989 | Sorimachi et al. | |
| 4,979,815 A * | 12/1990 | Tsikos | 356/3.06 |
| 5,175,601 A | 12/1992 | Fitts | |
| 5,218,427 A | 6/1993 | Koch | |
| 5,615,003 A | 3/1997 | Hermary et al. | |
| 5,680,215 A | 10/1997 | Huber et al. | |
| 5,753,931 A * | 5/1998 | Borchers et al. | 250/559.22 |
| 5,870,220 A | 2/1999 | Migdal et al. | |
| 6,369,401 B1 * | 4/2002 | Lee | 250/559.21 |
| 6,492,651 B2 | 12/2002 | Kerekes | |
| 6,542,246 B1 | 4/2003 | Toida | |
| 6,639,685 B1 | 10/2003 | Gu et al. | |
| 6,760,116 B2 | 7/2004 | Iwasaki | |
| 6,788,210 B1 | 9/2004 | Huang et al. | |
| 6,931,149 B2 * | 8/2005 | Hagene et al. | 382/141 |
| 7,180,606 B2 * | 2/2007 | Mahon et al. | 356/607 |
| 7,286,223 B2 | 10/2007 | Denney et al. | |
| 7,286,246 B2 | 10/2007 | Yoshida | |
| 7,375,826 B1 * | 5/2008 | Lavelle et al. | 356/607 |

(Continued)

FOREIGN PATENT DOCUMENTS

CN 100 427 9313 C 10/2008

(Continued)

OTHER PUBLICATIONS

International Search Report for Application No. PCT/US2010/036136 Dated Oct. 18, 2010.

(Continued)

*Primary Examiner* — Sang Nguyen
(74) *Attorney, Agent, or Firm* — Brinks Hofer Gilson & Lione

(57) ABSTRACT

A sensor system and method for analyzing a feature in a sensing volume is provided. The system receives image data from a sensor, where the image data including peaks corresponding to the intersection of laser lines with the feature. The system generates a dynamic window based on the entropy of the peaks.

20 Claims, 19 Drawing Sheets

U.S. PATENT DOCUMENTS

| | | | |
|---|---|---|---|
| 7,379,193 | B2 | 5/2008 | Liu |
| 7,595,892 | B2 | 9/2009 | Judell et al. |
| 7,719,672 | B2 | 5/2010 | Kohayase et al. |
| 2005/0231734 | A1 | 10/2005 | Johannesson et al. |
| 2007/0124949 | A1 | 6/2007 | Burns, Jr. et al. |
| 2008/0273194 | A1 | 11/2008 | De Sloovere et al. |
| 2009/0046279 | A1 | 2/2009 | Tentrup et al. |

FOREIGN PATENT DOCUMENTS

| | | |
|---|---|---|
| DE | 10 2008 041343 A1 | 2/2010 |
| EP | 1 906 139 A1 | 4/2008 |
| JP | 61 025003 A | 2/1986 |
| WO | WO 94/16290 A1 | 7/1994 |
| WO | WO 2009/120073 A2 | 10/2009 |
| WO | WO 2010/034301 A2 | 4/2010 |
| WO | WO 2010/138543 A1 | 12/2010 |

OTHER PUBLICATIONS

Simon Winkelbach et al., "Low-Cost Laser Range Scanner and Fast Surface Registration Approach", Jan. 1, 2006, Pattern Recognition: 28$^{th}$ Dagm Symposium, Berlin, Germany, Sep. 12-14, 2006; Proceedings; Lecture Notes In Computer Science, Springer, Berlin, DE, pp. 718-728.

Office Action for U.S. Appl. No. 12/796,233 Dated Nov. 24, 2010.

Notice of Allowance for U.S. Appl. No. 12/796,233, Mailed Apr. 6, 2011.

Notice of Allowance for U.S. Appl. No. 12/474,911, Mailed Jun. 2, 2011.

International Search Report for Application No. PCT/US2011/039543 Dated Oct. 21, 2011.

* cited by examiner

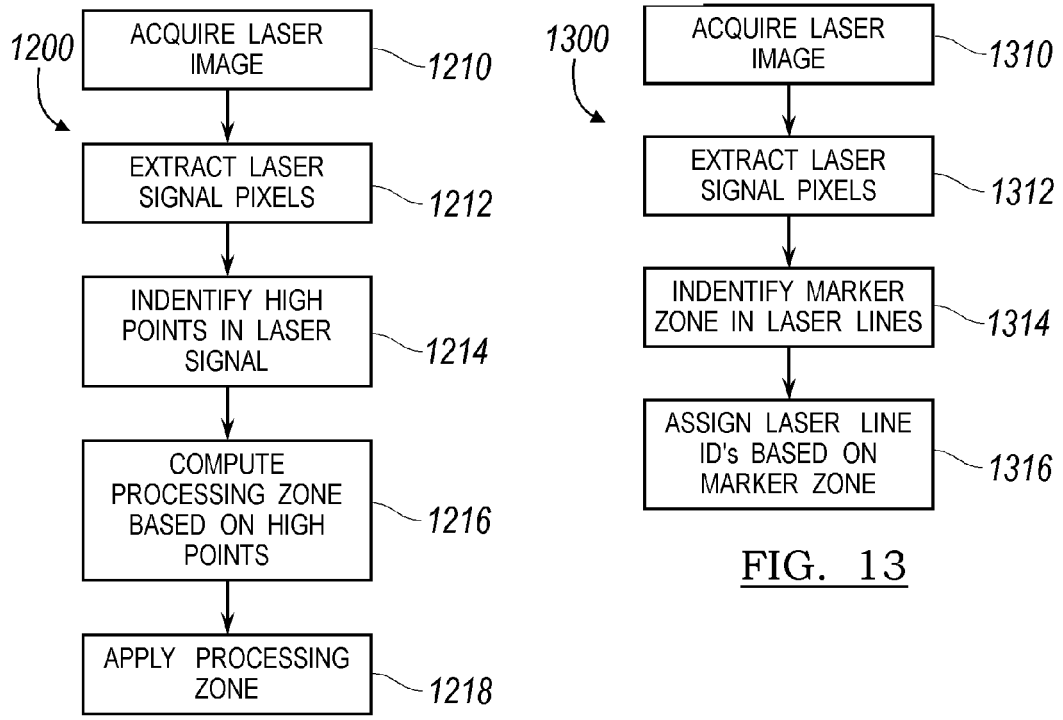
FIG. 12
FIG. 13
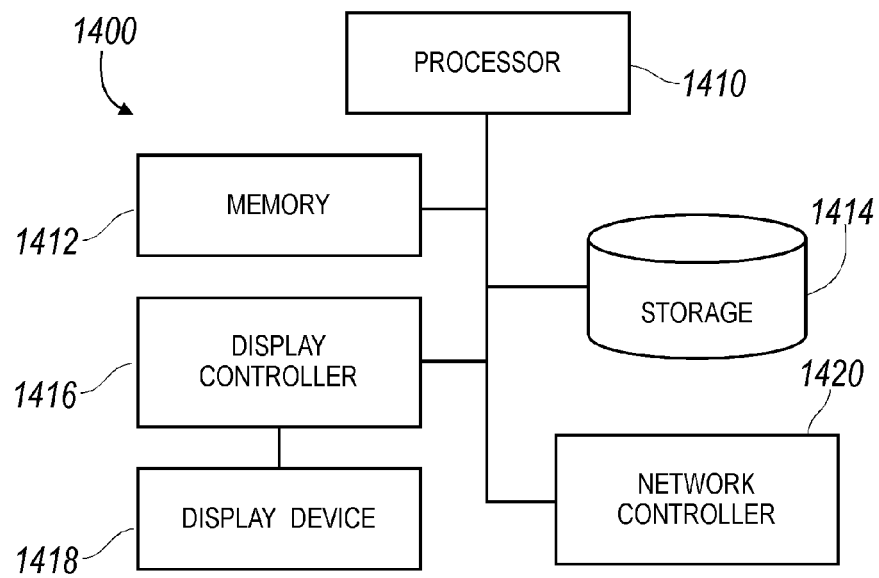
FIG. 14

SYSTEM AND METHOD FOR DYNAMIC WINDOWING

PRIORITY CLAIM

This application is a continuation-in-part of U.S. application Ser. No. 12/474,911 filed on May 29, 2009, which is incorporated in its entirety by reference herein.

BACKGROUND

1. Field of the Invention

The present application is generally related to system and method for determining the position or orientation of a feature.

2. Description of Related Art

The availability of 3D point cloud data has enabled absolute metrology systems. There are various modalities through which the 3D data is acquired. Laser scanning and moiré fringe techniques are some of the more popular commercial methods. These two methods produce reliable data in certain circumstances. Laser scanning typically relies on a motion device to provide 3D data. Motion can increase the cycle time of a measurement and may be impractical for many applications. Moiré fringe techniques rely on photogrammetric targets to calibrate and provide 3D data. The photogrammetric technique relies on several targets mounted on top of a sample part to obtain 3D data but produces point cloud information without sensor or part translation. However, these techniques can require multiple images to solve for the absolute depth and calibration is extensive. In addition, discontinuities in a surface may cause sensing problems. In addition, complex images are often presented in many 3D applications. Filtering out noise or unwanted image data can be helpful in identifying image data corresponding to the feature to be inspected.

In view of the above, it is apparent that there exists a need for an improved sensor system.

SUMMARY

In satisfying the above need, as well as overcoming the enumerated drawbacks and other limitations of the related art, the present application provides various sensor system embodiments for analyzing a feature in a sensing volume. In addition, a system and method is provided to dynamically window image data corresponding to a feature to be inspected. The feature may be a tire, a sheet metal part, or other surface to be inspected. This application will discuss in some detail the system with regard to a wheel alignment application, however, it is clear that the system and process may also be used for other applications.

The system may include a mounting structure, a laser source, a sensor, and a controller. The laser source being attached to the mounting structure and configured to project laser light, such as a plurality of laser lines, onto a feature. The sensor being attached to the mounting structure and configured to image the intersection of the laser lines with the feature. The controller may be in communication with the sensor to receive image data. The image data may include peaks corresponding to the intersection of the laser lines with the feature and the controller is configured to generate a dynamic window based on the entropy of the peaks.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

FIG. 12 is a flow chart illustrating a method for dynamic image processing window adjustment;

FIG. 13 is a flow chart illustrating a method for dynamic identification of laser lines;

FIG. 14 is a block diagram of a system illustrative of one implementation of the controllers, processors, or modules in the instant application;

DETAILED DESCRIPTION

Figure 1:
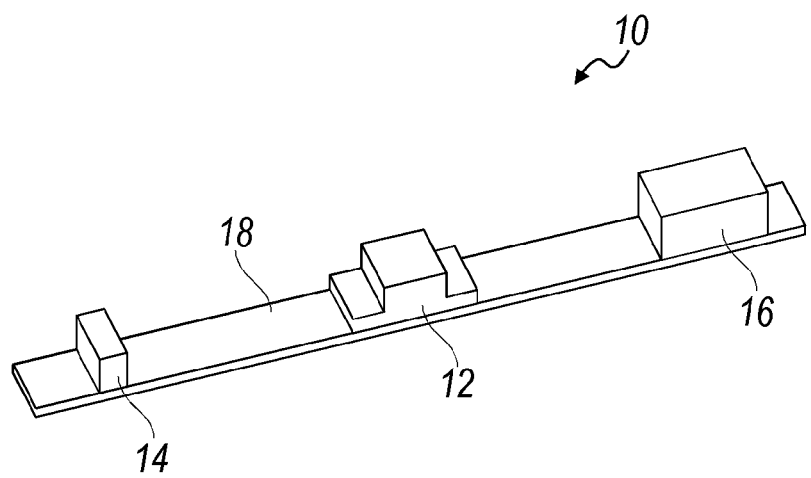
FIG. 1 is a block diagram illustrating a sensor system in accordance with one embodiment of this application.

Referring now to FIG. 1, a system embodying some of the principles of the present application is illustrated therein and designated at 10. The system 10 includes sensor 12, a first laser source 14, a second laser source 16, and a mounting structure 18.

The sensor 12 may be a camera and comprise receiving optics and a detector such as a CCD or CMOS array. Accordingly, the sensor 12 has a field of view that projects outwardly from the camera and a range of focus that is defined by the receiving optics of the sensor. The field of view and depth of focus define a sensing volume of the sensor 12. The first laser source 14 may project one or more laser lines onto an object. If more than one laser line is projected from the first laser source 14 the lines may be parallel to one another. In addition, the laser lines may be equally spaced with respect to each other. The first laser source 14 is oriented at an angle relative to the sensor such the laser lines intersect the field of view to define the sensing volume. In one configuration, the laser lines may be projected such the center laser line intersects the center of the sensing volume. Alternatively, if there are an even number of laser lines, the middle two laser lines may be approximately an equal distance from the center of the sensing volume.

The sensor 12 and the first laser source 14 may both be attached to the mounting structure 18. The mounting structure 18 may be an optical bench, tube, or other rigid form. The mounting structure 18 may be made from a material with a low coefficient of expansion so that the relationship between the sensor 12 and the first laser source 14 is held constant across a wide temperature range. Alternatively, the mounting structure 18 may include a number of temperature sensors to compensate for expansion of the mounting structure material. The mounting structure 18 may be formed from a number of materials including but not limited to steel, invar, aluminum, or other industrial materials. For example, the mounting structure 18 may be an I-tube (shown as reference numeral 1510 in FIG. 15). As such, the mounting structure 18 provides both passive thermal management as well as provides a linear response. The linear response without hysteresis enables accurate active thermal compensation.

The sensor 12 and the first laser source 14 may be factory aligned relative to one another. For example, the sensor 12 and first laser source 14 may be mounted onto the mounting structure 18 with the use of various fixtures to control the alignment and/or relative position of the sensor 12 and first laser source 14. In addition, the sensor 12 and first laser source 14 may be mounted to a precision stage, for example through the mounting structure 18. The precision stage may include a known target. The known target may be moved throughout the sensing volume by the precision stage such that the relationship between the sensed position of the target can be calibrated throughout the sensor volume. The calibration can be stored in the sensor as various sensor system model parameters including sensor parameters, laser source parameters, etc.

Based on the calibration, the relationship between the sensor 12 and the first laser source 14 is known and triangulation may be used to determine the distance from the sensor 12 to a position where a laser line intersects a feature in the sensing volume. As such, the position of the feature relative to the sensor 12 can be determined based on the factory calibration regardless of the orientation or positioning of the sensor 12. Further, a system including many sensors may be formed by determining the position and orientation of each sensor relative to a master coordinate space. This may be done for larger systems by using a laser tracker or theodalites to determine the position and orientation of the sensors directly or by using such devices to determine the position and orientation of a target in the sensing volume then determining a transform between the sensor coordinate space and the master coordinate space.

A second laser source 16 may also be provided. The second laser source 16 may be a laser projector such as a structured light projector or a moiré fringe projector. The second laser source 16 may be mounted to the mounting structure 18 or alternatively may be mounted independently of the mounting structure 18. If the second laser source 16 is mounted on the mounting structure 18, the position and orientation of the second light source may be factory calibrated similar to the first laser source 14. However, often times the geometry of the part or the tooling where the part is to be measured may present certain environmental constraints that would limit the effectiveness of the second laser source 16 being mounted to the mounting structure 18. In this scenario, a known target may be positioned into the sensing volume and the position of the known target to the sensor may be determined based on a triangulation of the laser line with the sensor. For example, the laser line may be projected on a flat surface and the position and orientation of the surface determined based on the position of the laser stripe within the field of view of the sensor. The second set of lines may then be projected onto the surface and the orientation and position of the second laser source may be determined based on the projected line pattern on the surface. For example, the spacing and angle of an array of line stripes formed on the surface intersect with the laser stripe from the first laser source 14. The intersection points between the laser stripe and the pattern from the second laser source 16 can be used to determine the position and orientation of the second laser source 16.

Figure 2:
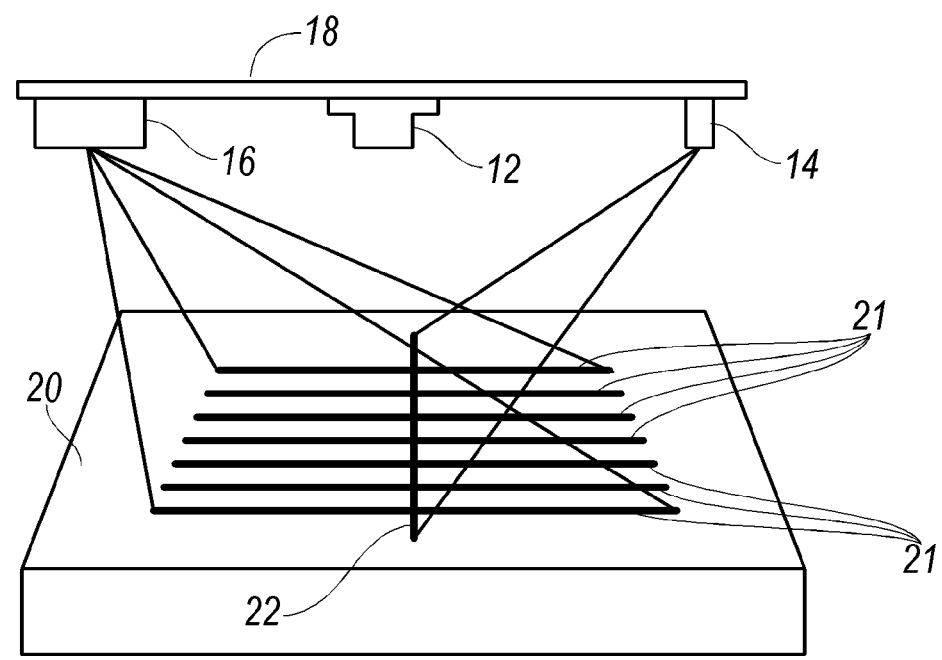
FIG. 2 is a block diagram illustrating a sensor system including a structured light projector.

Therefore, the second laser source 16 may be a structured light projector, as depicted in FIG. 2. As discussed, the detector 12 is calibrated with respect to first laser source 14. As such, these two components work together using triangulation principles. The angle between the first laser source 14, thus the laser line, and the optical axis of the sensor are used to determine the distance and location of features on the surface 20. In, addition the second laser source 16 projects a series of lines onto the surface 20. The series of lines 21 from the second laser source 16 may be oriented orthogonal to the line or lines from the first laser source 14. The intersection of the line or lines from the first laser source 14 is used to determine the surface position of the series of lines 21 on the surface from the second laser source 16. The line 22 from the first laser source 14 may act as a reference for the projected pattern from the second laser source 16. The surface is then modeled using a camera/optics model. The camera/optics model may be generated based on taking a few field calibration images once the sensor is finally mounted using a flat surface at a number of distances from the sensor. Accordingly, the second laser source 16 can be mounted separately from the sensor 12 and first laser projector 14, and field calibrated, as described above.

Figure 3:
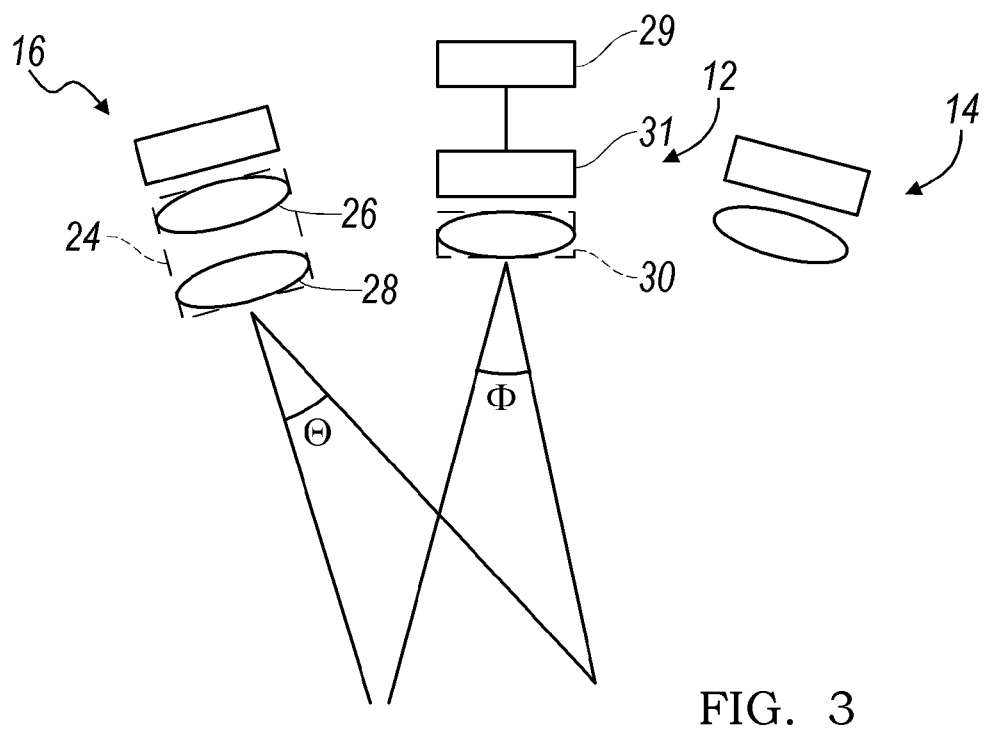
FIG. 3 is a block diagram of a sensor system illustrating the optical elements of the laser sources and sensor.

The mechanics of the sensor system of FIG. 1 are further explained with respect to FIG. 3. The keystoning effect of the structured light pattern increases the depth sensitivity of the measurement. Therefore, projection angle (theta) of second laser source 16 should be designed to be different than the receiving angle (phi) of the sensor 12. For example, the projection angle may be 10 to 15 degrees different than the receiving angle. To facilitate the key stoning effect, the projection optical system 24 of the laser projector 16 may include two lenses 26, 28. The additional lens 28 may be used to vary the magnification between the receiving optic 30 and the projection optical system 24. Specifically, the projection optical system 24 may have 1.5-3 times the magnification of the receiving optic 30 within the sensing volume. Although, other ratios may be used, this may provide particular benefits for many industrial applications.

Each of the first and second laser sources 14, 16 and the detector 31 may be in communication with the sensor controller 29. The sensor controller 29 may independently control the time and intensity of each laser source 14, 16. In addition, the sensor controller 29 controls the acquisition and integration time of the detector 30. The sensor controller 29 may alternate the projection of the first set of laser lines from the first source 14 and the second set of laser lines from the second laser source 16. In addition, the detector 31 may be synchronized with the projection of the first and second laser sources 14, 16 to capture the first set of laser lines from the first laser source 14 in the first image and the second set of laser lines from the second laser source 16 in a second image.

Figure 4:
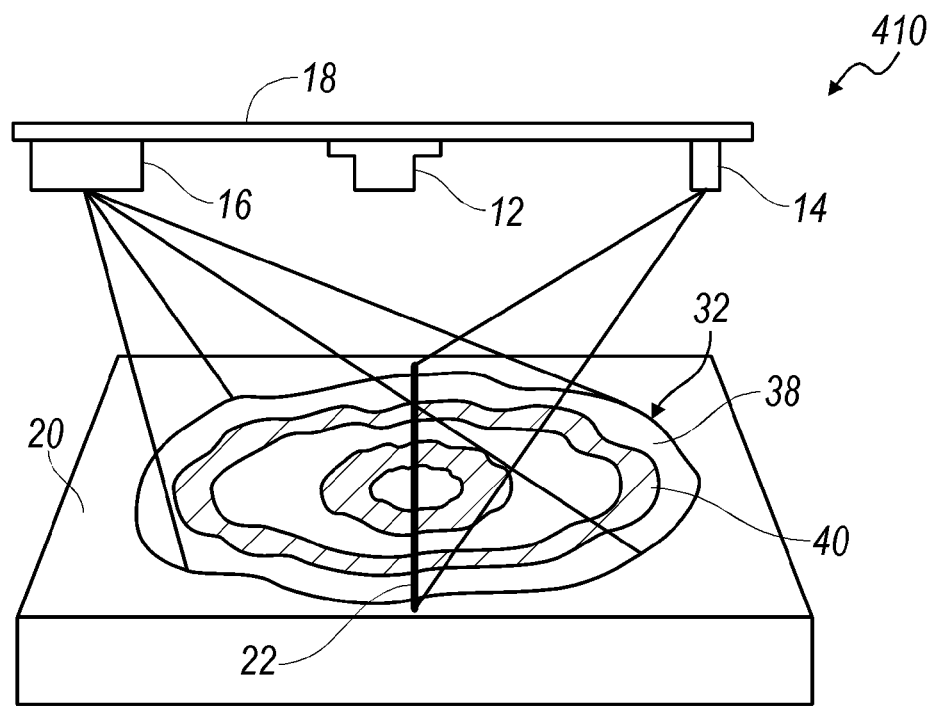
FIG. 4 is a block diagram illustrating a sensor system including a moiré fringe projector.

The second laser source 16 may also be a moiré fringe projector, as illustrated in the system 410 of FIG. 4. The moiré fringe projector may emit two wavelengths of laser beams that interfere, thereby projecting a moiré fringe pattern 32 onto the surface 20. The moiré fringe pattern 32 is like a topographical map with each ring of the fringe pattern equating to a different distance from the second laser source 16. The moiré fringe pattern 16 includes alternating rings of light rings 38 and dark rings 40 that tend to have a sinusoidal profile. Again, the line 22 acts as a reference relative to the distance of each of the rings.

Figure 5:
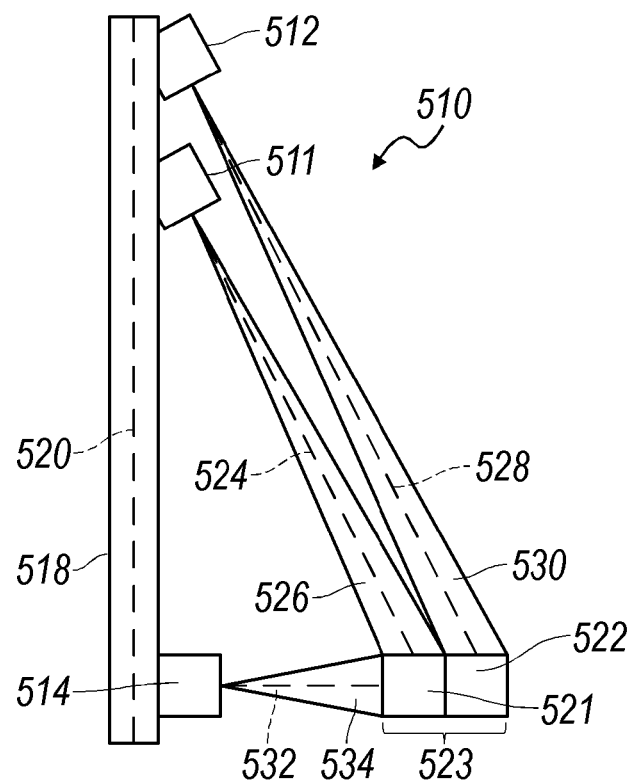
FIG. 5 is a block diagram illustrating a sensor system including a dual sensor configuration.

Another embodiment of the sensor system is illustrated in FIG. 5. The sensor system 510 includes a first sensor 511, a second sensor 512, and a laser source 514. The first sensor 511 and second sensor 512 are attached to a mounting structure 518. The first sensor 511 and second sensor 512 may be CCD, CMOS, or other similar sensors including other features, such as a sensor controller, as described with regard to sensors of the previous embodiments. The laser source 514 is also attached to the mounting structure 518 and is configured to project a laser pattern 534 onto an object. The laser pattern may be any of the patterns described above, or more specifically, may include a series of lines that are pre-calibrated relative to each of the first sensor 511 and second sensor 512. The pre-calibration may be a factory calibration as described relative to the previous embodiments.

The sensor system 510 has a sensor axis 520 that is substantially perpendicular to the optical axis 532 of the laser source 514. A first sensor 511 is oriented at an angle relative to the sensor axis 520 that is slightly less than the second sensor 512. For example, the first sensor 511 may have an optical axis 524 that is oriented at a 17° angle relative to the sensor axis 520. Further, by way of example, the second sensor 512 may have an optical axis 528 that is oriented at a 22° angle relative to the sensor axis 520. As such, the first sensor 511 has a field of view denoted by reference number 526 that intersects with a laser projection 534 to form a sensing volume 521. The axis of the laser projection 534 may be orthogonal to the sensor axis 520 and may be in plane with the sensor optical axes 528 and 524. Similarly, the second sensor 512 has a field of view 530 that intersects with the laser projection 534 to form a second sensing volume 522. The first and second sensor 511 and 512 are oriented such that the first sensing volume 521 and the second sensing volume 522 form a contiguous sensing volume 523.

Figure 6:
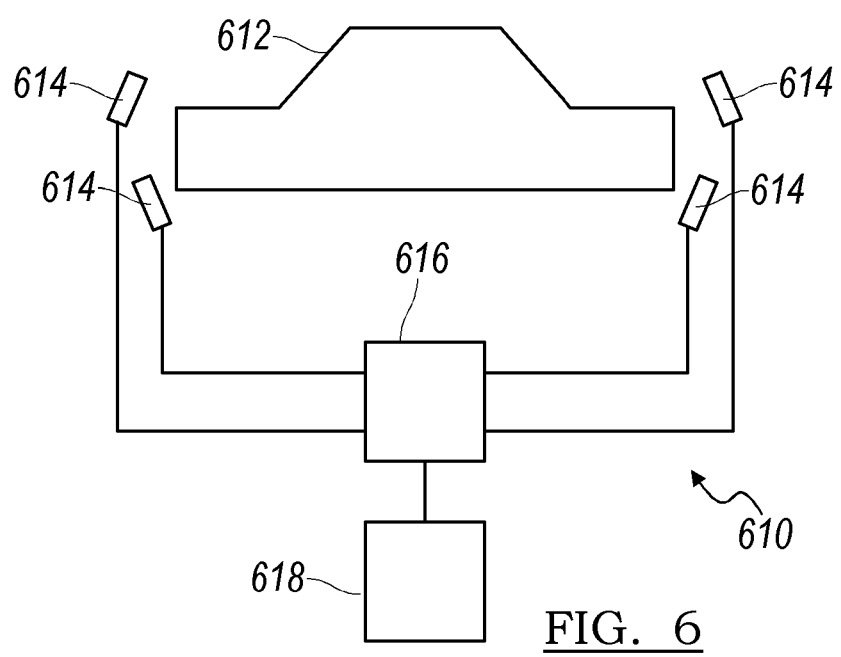
FIG. 6 is a block diagram illustrating one embodiment of a system for measuring features with the disclosed sensor implementations.

The first sensing volume 521 slightly overlaps with the second sensing volume 522 to form the contiguous sensing volume 523. The sensing volume 521 is closer to the mounting structure and sensing volume 522 and most of the sensing volume 521 does not overlap with the sensing volume 522, and similarly most of the sensing volume 522 does not overlap with sensing volume 521. For ease of illustration, the sensing volumes are shown as squares. However, it is clear that the first sensing volume 521 and second sensing volume 522 would have an actual 3-D shape formed by the intersection of the first field of view 526 with the laser projection 534 and the second field of view 530 with the laser projection 534, respectively. This shape would, of course, be expanding as the distance increases relative to the sensor or projector and may have curved outer regions based on the effects of the optical system. As such, the first sensor 511 and the second sensor 512 work together thereby greatly increasing the depth of field which can be analyzed while providing sufficient resolution for most applications. Further, it is also clear that similar to the previous embodiments, a second laser source may also be provided and oriented to project a laser pattern to intersect with the first and second sensing volumes 521, 522. As discussed above, the second laser source may be attached to the mounting structure or mounted independently In FIG. 6, a measurement system 610 including an array of sensors 614 is provided. Each sensor 614 corresponds to a sensor system 10, 410 or 510 including any variation or combination thereof described above. The system 610 includes a controller 616 and at least one sensor 614. There may be a number of sensors 614 located about a vehicle body or frame 612 to measure geometric dimensional deviations at a number of specified locations. Alternatively, a single sensor may be used along with a motion device such that the sensor 614 is able to measure multiple features along the vehicle body 612. For example, the sensor 614 may be attached to a robotic arm that can be manipulated to measure a number of features at various locations on the vehicle body 612.

The sensor 614 is in electrical communication with the controller 616 to provide a set of data for each feature measured. The sensor 614 may include an on board processor to analyze the image data and generate feature data, for example indicating the position and orientation of feature. The feature data may be communicated to the controller 616. The sensor 614 may communicate with the controller 616 over a number of wired or wireless communication protocols including but not limited to Ethernet. The controller 616 includes a microprocessor configured to analyze the data. In addition, the controller 616 is in communication with an alarm system 618 to generate an alert based on the measurements from the sensor 614. The alarm system 618 may comprise a visual indicator such as a flashing light, an audio indicator such as a siren, or both. In addition, the alarm system 618 may comprise a communication system configured to send an email, phone message, pager message, or similar alert.

Figure 7:
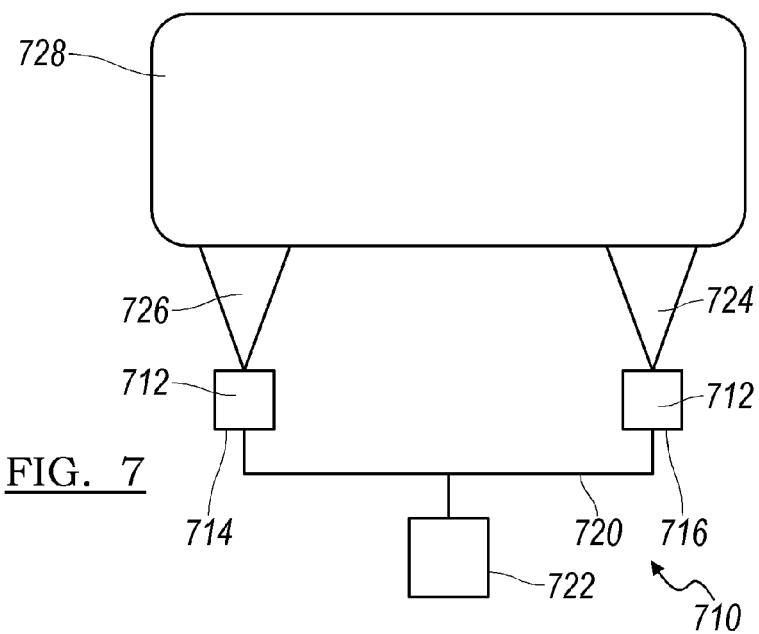
FIG. 7 is a block diagram illustrating one embodiment of a system for measuring wheel alignment with the disclosed sensor implementations.

Now referring to FIG. 7, an inspection system 710 is provided for the inspection of wheel alignment of a vehicle. As such, the inspection system 710 includes two sensor systems 712 which may correspond with any of the sensor systems 10, 410, or 510 including variations described in the previous embodiments or combinations thereof. However, for illustrative purposes, the system 710 will be described further with regards to the implementation of the sensor system 510 shown in FIG. 5. As such, the inspection system 710 includes a left sensor 714 that projects a laser pattern 726 onto a left side of tire 728. Similarly, inspection 710 includes a right sensor 716 that projects a second laser pattern 724 onto the right sidewall of the tire 728. Accordingly, the left sensor 714 and the right sensor 716 may determine the position and orientation of both the left sidewall of the tire and right sidewall of the tire 728 to determine an overall position and orientation of the tire 728.

The system 710 may be duplicated for each tire on the vehicle and accordingly a wheel alignment calculation may be performed including such measurements as toe, camber, pitch, etc., for each wheel of the vehicle. The sensor system 712 may be in communication over a communication link 720 to a controller 722. The communication link 720 may include wired or wireless communications including serial communications, Ethernet, or other communication mediums. The controller 722 may include a processor, memory, and display to perform a wheel alignment measurement. In addition, the controller 722 may be in communication with other sensor systems 712 measuring other tires or other controllers configured to inspect the alignment of other wheels on the vehicle.

Figure 8:
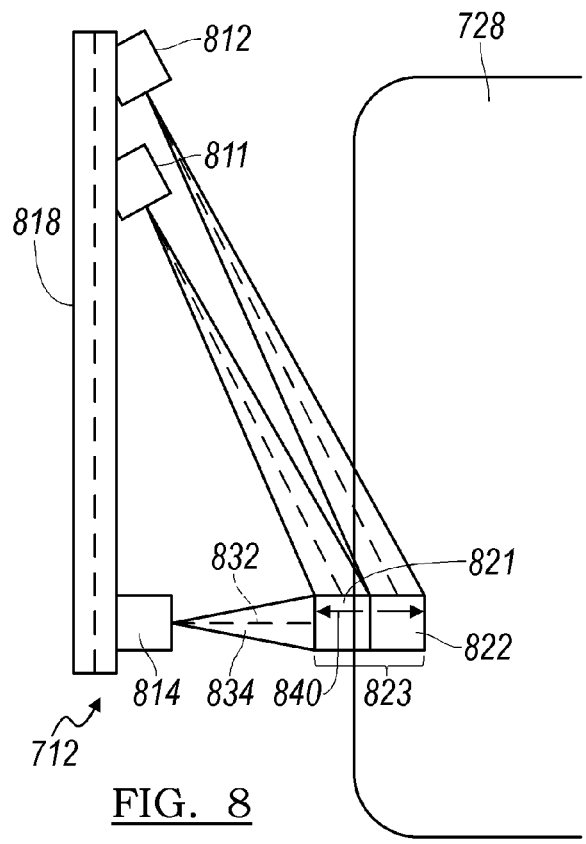
FIG. 8 is a side view of one embodiment of a system for measuring wheel alignment with the sensor implementation of FIG. 5.

Now referring to FIG. 8, a side view of the system 810 is provided illustrating one embodiment of the system in FIG. 7 implementing a dual sensor system described in FIG. 5. The sensor system 812 includes a first sensor 811 a second sensor 812, and a laser source 814. Each of the first sensor 811, the second sensor 812, and the laser source 814 may be attached to the mounting structure 818. The field of view of each of the first and second sensor 811, 812 intersect with the laser projection 834 of the laser source 814 to form a first and second sensing volume 821, 822. Further, the first sensing volume 821 and second sensing volume 822 overlap to form a continuous system sensing volume 823. As described above in reference to FIG. 5, the contiguous sensing volume 823 allows for increased sensing range between the sensor system 712 and the wheel 728.

This increased sensing range denoted by arrow 840 allows for the accommodation of a large number of tire models and wheel base vehicles, as well as a large steering angle change during a wheel alignment inspection. Further, the laser source 814 may include optics that provide a 1.5 to 3 times magnification relative to the receiving optics of both the first sensor 811 throughout the first sensing volume 821 and the second sensor 812 throughout the second sensing volume 822.

Figure 9:
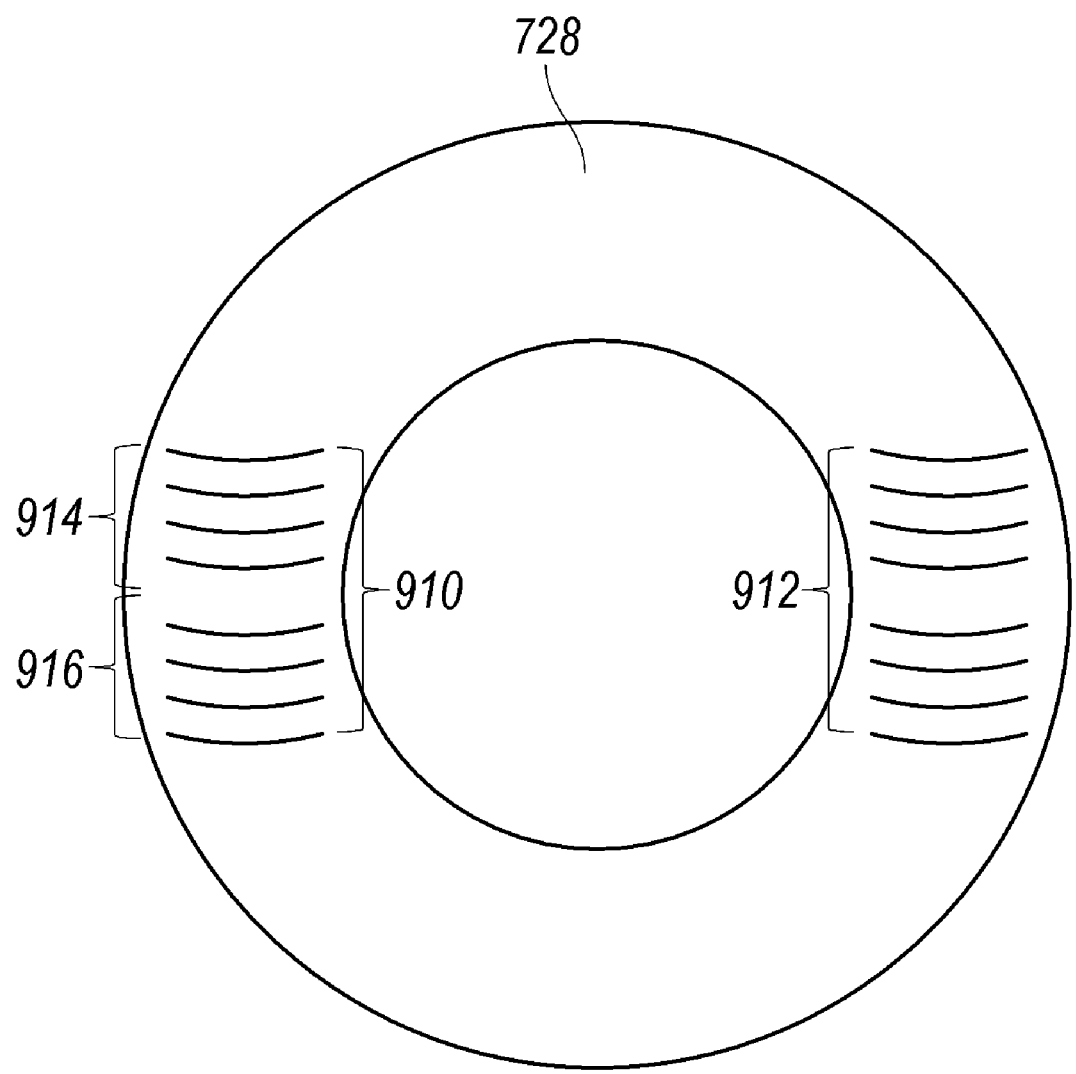
FIG. 9 is a front view of a laser pattern projected onto a tire for one embodiment of a system for measuring wheel alignment.

Now referring to FIG. 9, a front view of the tire illustrating one embodiment of the projected laser pattern is provided. In this embodiment, the left sensor 714 projects a laser pattern 910 including a series of parallel lines onto the left-hand sidewall of the tire 728. Similarly, the right sensor 716 projects a pattern 912 including a series of lines onto the right-hand sidewall of the tire 728. The pattern may include a first set of lines 914 and a second set of lines 916, where the first set of lines 914 are parallel and have equal spacing between each consecutive line. Similarly, the second set of lines 916 may have a set of parallel lines where each consecutive line has equal spacing. Further, the spacing for the second set of lines 916 may be the same as the spacing provided in the first set of lines 914.

Figure 10:
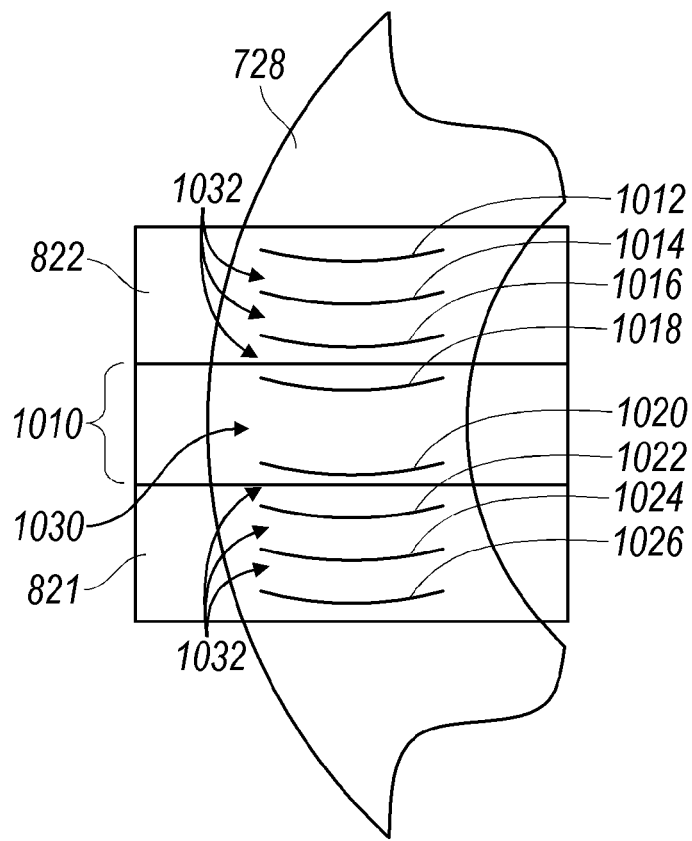
FIG. 10 is front view of a laser pattern projected onto a tire for one embodiment of a system for measuring wheel alignment.

Now referring to FIG. 10, the first and second set of lines 914 and 916 are described in more detail. The first set of lines 914 may include a first line 1012, a second line 1014, a third line 1016 and a fourth line 1018. Further, the second set of lines may have a fifth line 1020, a sixth line 1022, a seventh line 1024 and an eighth line 1026. The lines may have equal spacing as denoted by reference numeral 1032. However, the distance between the fourth line 1018 and the fifth line 1020 may include a greater spacing 1030 as a line identification. The spacing 1030 may be, for example, twice the spacing as between the other lines. This may be easily and effectively accomplished by modifying the grating of a laser line projection source such that the middle two lines of the grating are not etched but filled in and therefore do not transmit light. The additional spacing 1030 may be used to identify specific line numbers in the pattern.

The first sensing volume 821 of the first sensor and the second sensing volume 822 of the second sensor may have an overlap region 1010 such that the double spacing 1030 may be detected by each of the first sensor and second sensor. Accordingly, the overlap 1010 would be great enough to show the fourth line 1018 in the first sensing volume 821 and the fifth line 1020 in the second sensing volume 822. However, as can be readily understood, the array of lines may include more than eight lines and as such, the fourth line 1018 and the fifth line 1020 would be representative of the middle two lines of the pattern. Using the change in spacing encodes the line pattern and allows the system to easily identify the middle two lines, thereby identifying each line within each sensing volume. After identifying each line, the relationship between the position of the object, in this case the wheel 728 may be determined using a sensor model and the predetermined calibration parameters. The sensor model may include a camera model that accounts for the detector and optical parameters of the sensor, as well as, a laser source model that accounts for the laser pattern and projection objects. Further, the sensor model and laser source model may be linked by the predetermined calibration parameters to provide 3D point cloud data on the object.

Figure 11:
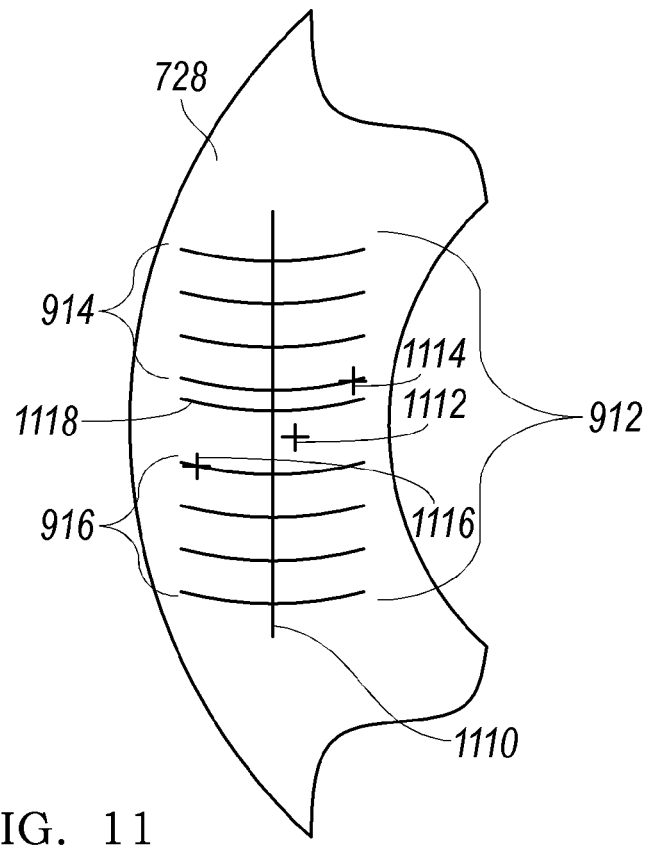
FIG. 11 is front view illustrating various laser pattern implementations projected onto a tire for one embodiment of a system for measuring wheel alignment.

Now referring to FIG. 11, additional embodiments are provided for identifying each line in the pattern 912. In one embodiment a second laser line 1110 may be provided orthogonal to the series of laser lines from a second laser projector. Alternatively, a unique symbol 1112, such as a crosshair, may be provided in addition to the series of lines that may be used to identify each of the lines in the series based on a spacial relationship. In another alternative, each of the middle two lines may have a mark 1114, 1116, such as a cross tick where the cross tick 1114 on the first set of lines 914 is on one side and the cross tick 1116 of the second set of lines 916 is on an opposite side. As such, each of the cross ticks is distinguishable and may be used to identify each of the lines in the series of lines based on the spacial relationship. In yet another alternative, the spacing between the lines may vary such that the number of each line may be identified based on a varied spacing relationship between one or more of the consecutive lines. In one example, a double line 1118 may be provided. The two lines may be provided closely together uniquely identifies one line in the series of lines and then each of the other lines may be identified by a consecutive spacial relationship. Further, other identifying characteristics may be provided for encoding the series of consecutive lines including other various unique marks, or line spacing, line thicknesses, or line orientation.

Now referring to FIG. 12, a method for dynamic image processing window adjustment is provided. A method 1200 starts in block 1210. In block 1210, a laser source projects a pattern onto a feature and an image is acquired of the pattern intersecting the feature. In one implementation, the pattern may be the parallel lines 912 in FIG. 9. In block 1212, the laser signal pixels are extracted from the image. As such, each of the pixels along the line may be transformed into a line intensity profile. As such, a reference line is defined that is substantially orthogonal to the series of laser lines and may be acquired with temporal offset. A laser line profile is determined by adding the intensity value orthogonal to the reference line after correction for sensor and laser projection distortions by a camera and/or laser projection model. In block 1214, high points are identified in the laser profile. Processing zones are computed based on the high points in the profile, as denoted by block 1216. Finally, processing zones are applied and 3D point cloud data is extracted based on general triangulation principles.

Referring to FIG. 13, a method for the dynamic identification and assignment of laser lines is provided. The method 1300 starts in block 1310. In block 1310, the laser is projected onto the feature and an image is acquired. In block 1312, the laser signal pixels are extracted. The marker zones in the laser lines are identified as denoted by block 1314. The laser line data is projected on to a reference line, a threshold is applied to integrated projected values to identify nodes points on the laser lines. The node points along the reference line are then extracted. The reference line may represent the mean location on the object being measured. The spacing between nodes are then used to identify line numbers. In one exemplary, the numbering will start from the center where we have higher spacing relative to its immediate neighbors. In block 1316, the laser line numbers are assigned based on the marker zones.

As such, it is understood that the method shown in FIGS. 12 and 13 may be utilized together in a single process. For example, the marker zones may be identified 1314 and laser line numbers assigned 1316 in between step 1216 and the point cloud data being extracted. Further, the above described methods may be performed by the sensor controller and as such the point cloud data may be transmitted from the sensor to the system controller. Alternatively, the system controller may be utilized for implementing the methods.

Figure 15:
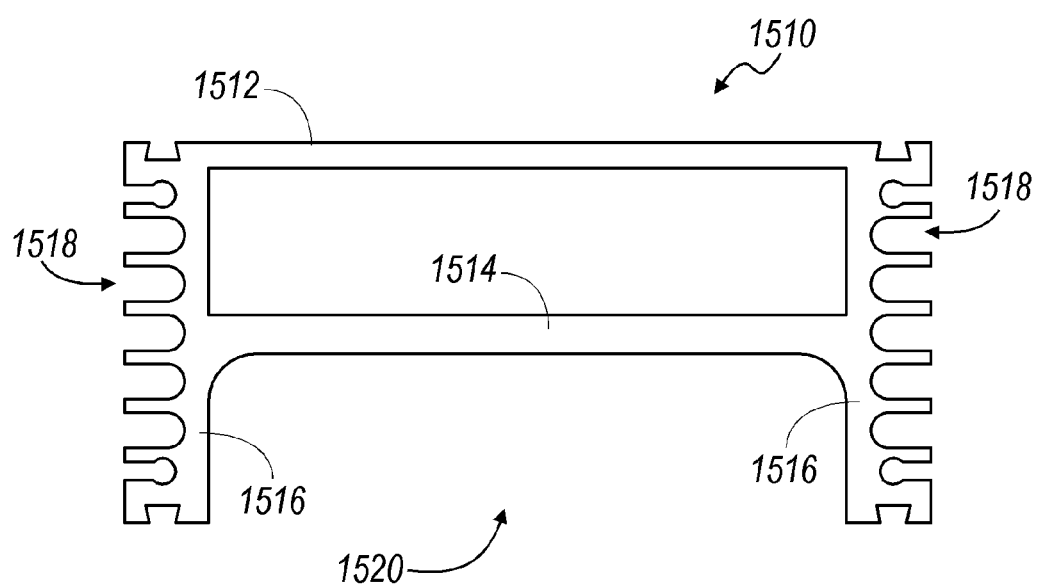
FIG. 15 is top view of a mounting structure for a sensor system.

Referring to FIG. 15, the mounting structure 18 may be an I-tube 1510. The I-tube includes a tube portion 1512 with an I-beam 1514. Walls 1516 extend beyond the I-beam 1514 and form a recess 1520. The laser source and detectors may be mounted in the recess 1520 to the I-beam 1514. In addition, the I-tube may include cooling fins 1518 to increase dissipation of heat. The I-tube 1510 may be formed from a number of materials including but not limited to steel, invar, aluminum, or other industrial materials. The I-tube 1510 may include a number of temperature sensors to compensate for expansion of the I-tube material. As such, the I-tube 1510 provides both passive thermal management as well as provides a linear response. The tubular shape and I-beam limit expansion in directions other than along the length of the tube. The linear response without hysteresis enables accurate active thermal compensation.

Figure 16:
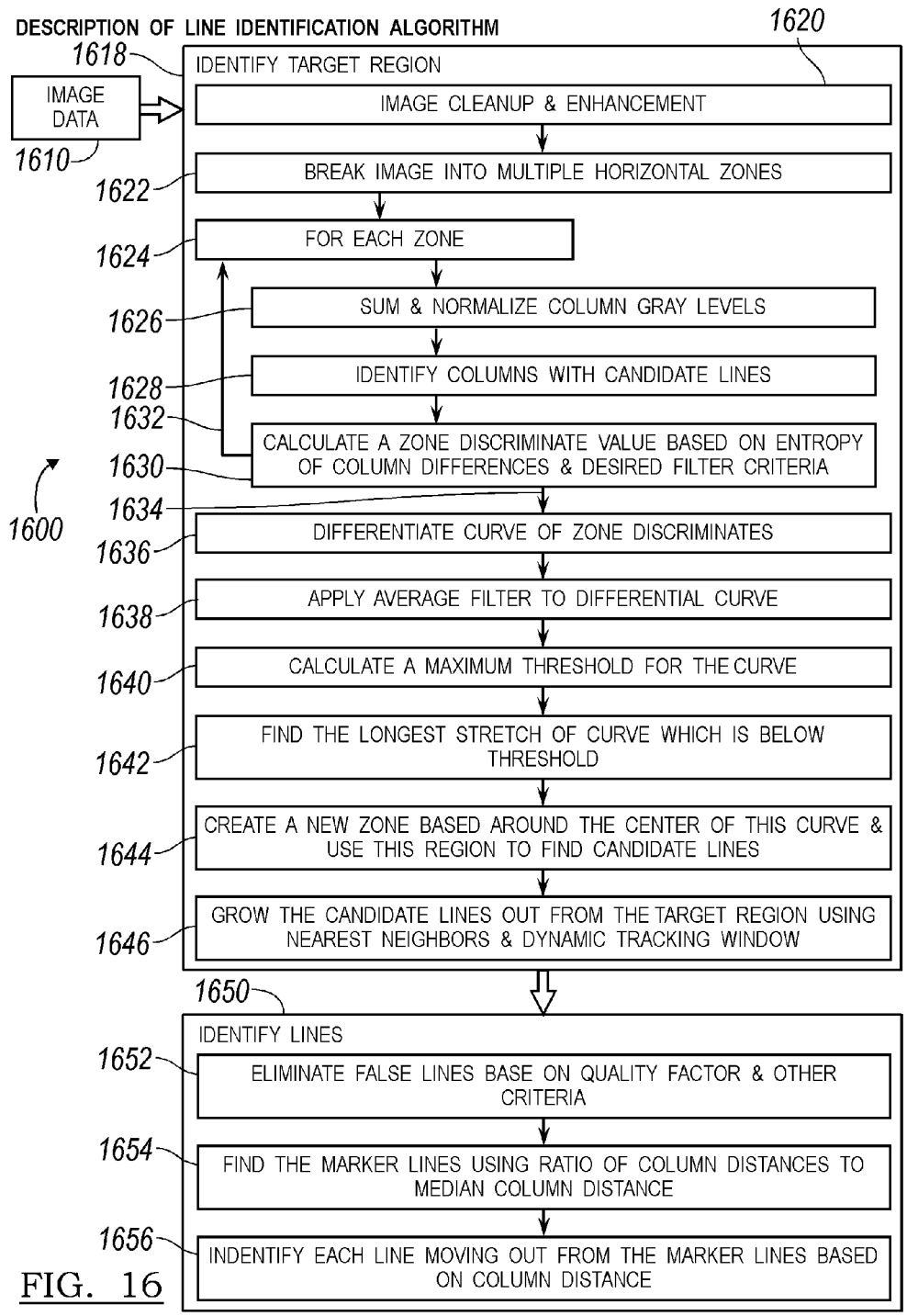
FIG. 16 is a flowchart of a method for identifying lines in the image data.

Referring to FIG. 16, a method 1600 is provided for identifying laser lines projected onto a part. The type of part may vary based on the application, for example, a wheel, a sheet metal part, or other surface. In block 1610, image data is captured by a sensor such as a camera. The camera is configured to receive an image of the laser lines projected onto a part which is to be inspected. The camera may include a plurality of pixels organized in rows and columns and may, for example, be configured as the sensor in any one of the previously described sensor systems. An illustration of the gray scale image data for lines projected onto a wheel is provided as reference number 1700 in FIG. 17. The image data from block 1610 may be provided to a controller to identify the target region, as denoted by block 1618. In block 1620, the image will be cleaned up and enhanced for example using commonly known image processing algorithms such as various smoothing algorithms or edge enhancement algorithms. In block 1622, the image may be divided into multiple horizontal zones. The number of zones may be different for various applications.

Figure 17:
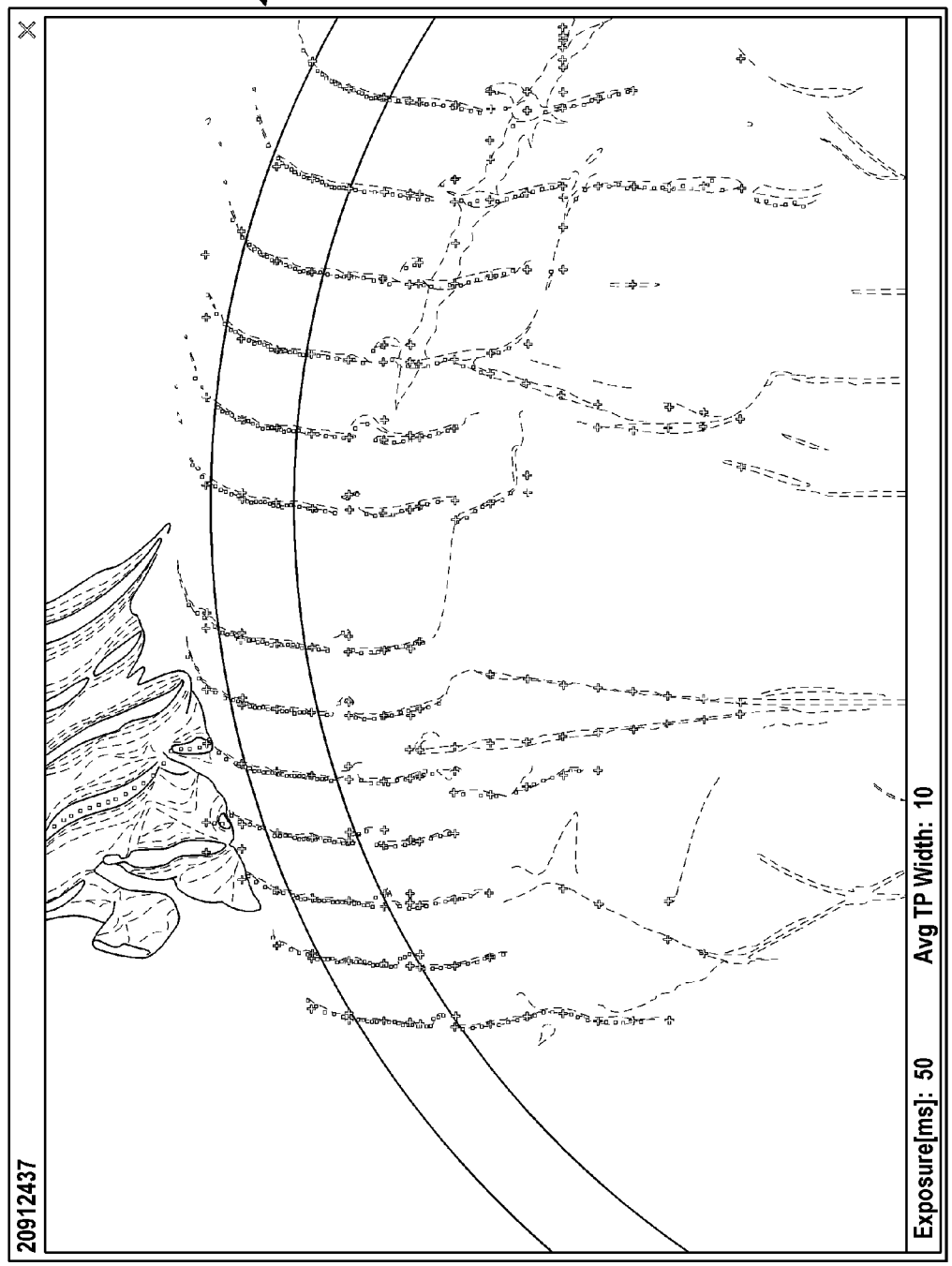
FIG. 17 is a graphical representation of the grayscale image data.
Figure 18:
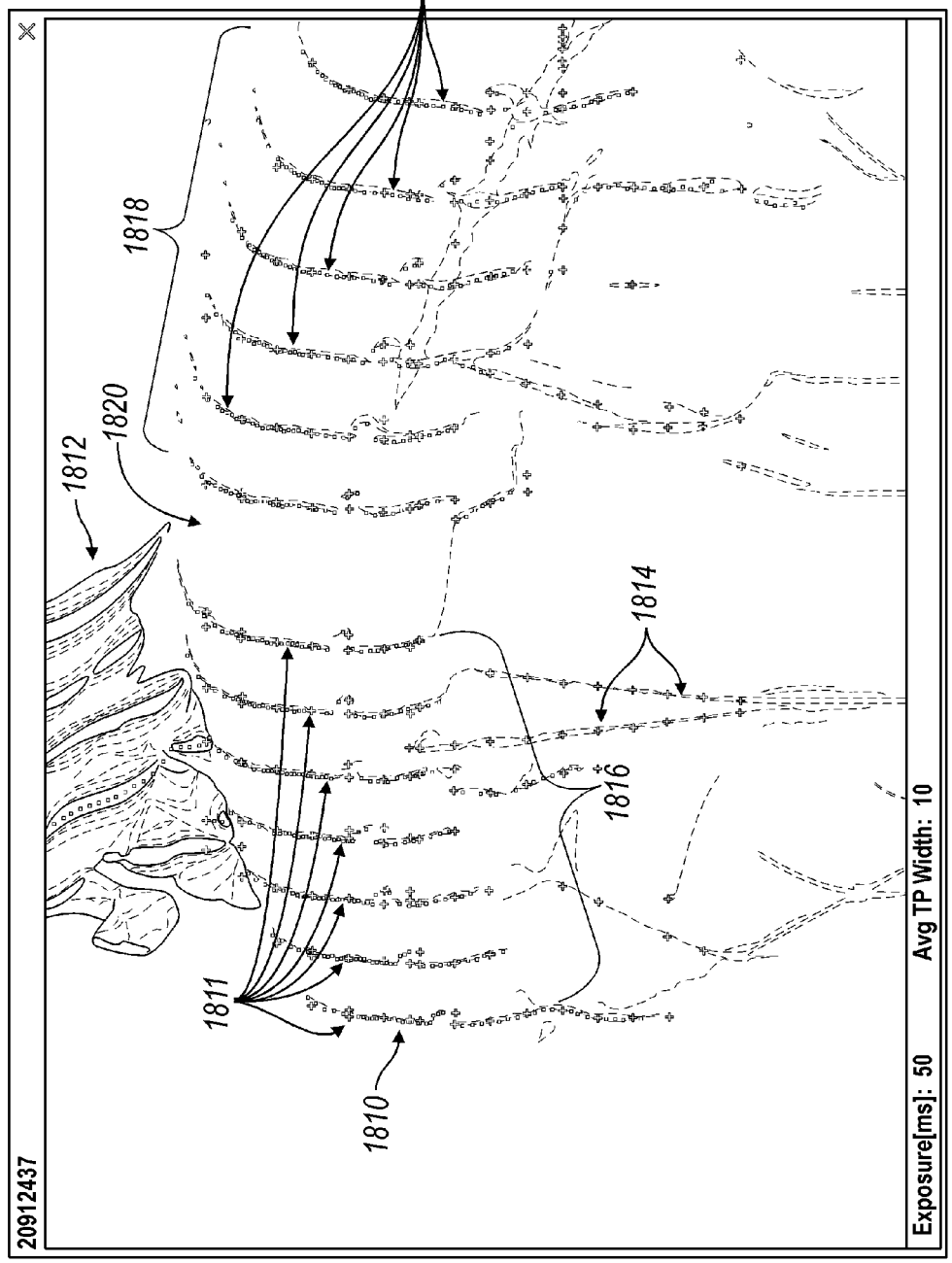
FIG. 18 is a graphical representation of the image data in edge enhanced form for illustrative purposes.

For better understanding of the image data in FIG. 17, an edge enhanced image is provided in FIG. 18 allowing various feature of the image to be easily denoted for illustrative purposes. However, for the purposes of the exemplary algorithm provided, the process described would be implemented using the gray scale values as shown in FIG. 17. Of course, it is understood that the same algorithm could be performed on an edge enhanced image, a smooth image, or an image that has been enhanced by combination of an edge enhancement or smoothing techniques. The set of laser lines that are projected onto the tire are generally denoted by reference numeral 1810. The set of laser lines include a plurality of laser lines that are each denoted by reference numeral 1811. The laser lines may conform to the various configurations described above with respect to the other embodiments described herein.

In addition, various other noise and reflections may also be present in the image data. Some of the noise or reflections may be caused by the laser lines reflecting off of other objects within the field of view or based on other illumination sources. For example, reflections denoted by reference numeral 1814 may be various reflections caused by the laser lines projecting onto the wheel rim structure rather than the tire surface. Similarly, reference numeral 1812 denotes reflections of the laser line off of another object such as a fender or the wheel housing which the algorithm will also want to ignore when identifying the laser lines that are projected onto the tire surface, as denoted by reference numeral 1811. In this embodiment, the laser lines are broken into a first set 1816 and a second set 1818 with a gap 1820 between the first set 1816 and the second set 1818.

Figure 19:
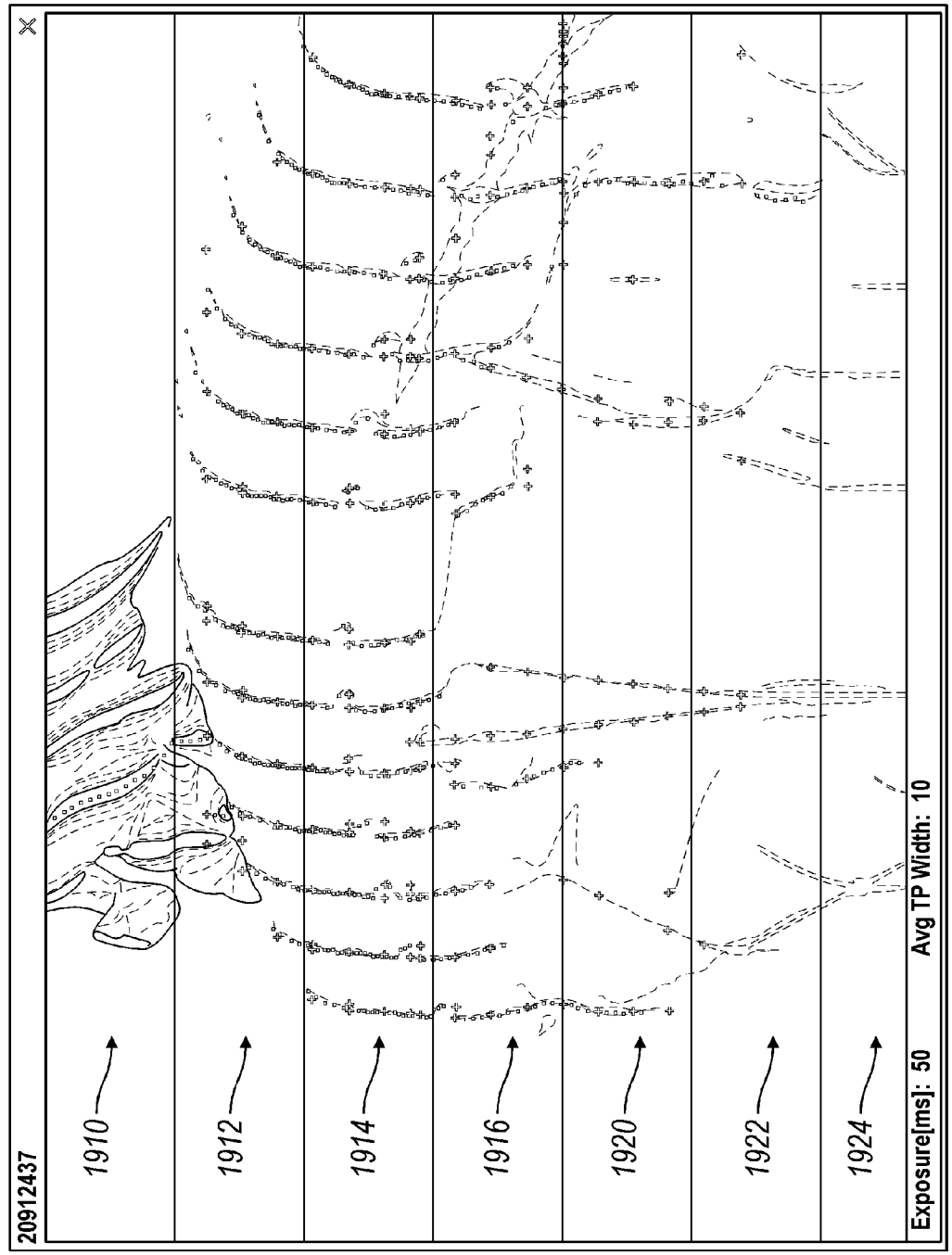
FIG. 19 is a graphical representation of the image data with zone windows.

FIG. 19 illustrates the image being divided into seven horizontal zones, 1910, 1912, 1914, 1916, 1920, 1922, and 1924. The number and size of the zones may be varied depending on the application. Such factors as the size of the field of view and the length of the line projections may be considered when determining the number and size of the zones. Referring again to FIG. 16, each zone may be processed as denoted in block 1624. In block 1626, the gray scale values for each pixel within the zone are summed and normalized for that column, as denoted by block 1626. The process of summing and normalizing the column gray levels in block 1626 may be better understood with regard to FIG. 20.

Figure 20:
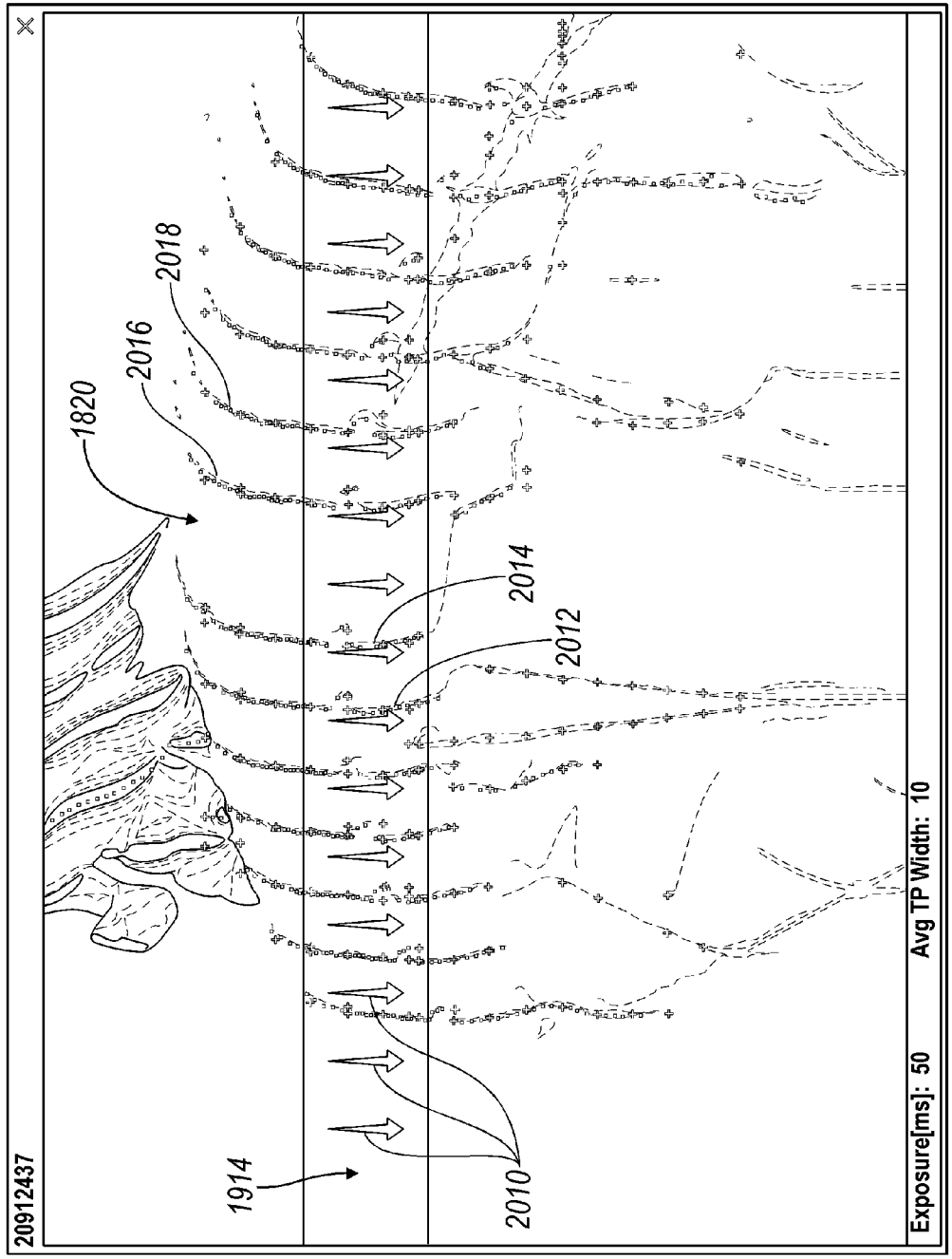
FIG. 20 is a graphical representation of the image data illustrating the processing of a zone window.
Figure 21:
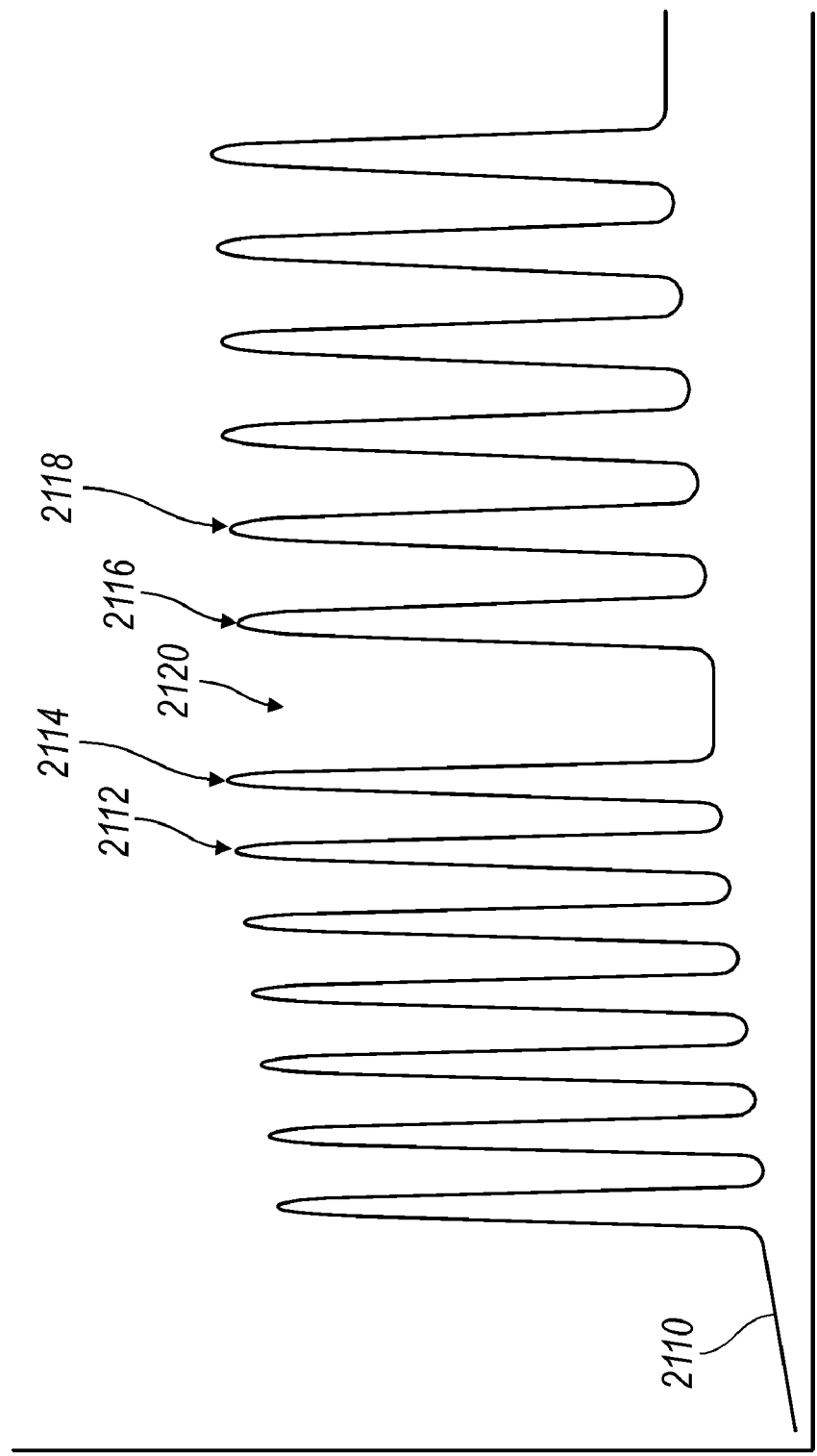
FIG. 21 is a graphical representation of the profile of the summed and normalized zone data.
Figure 22:
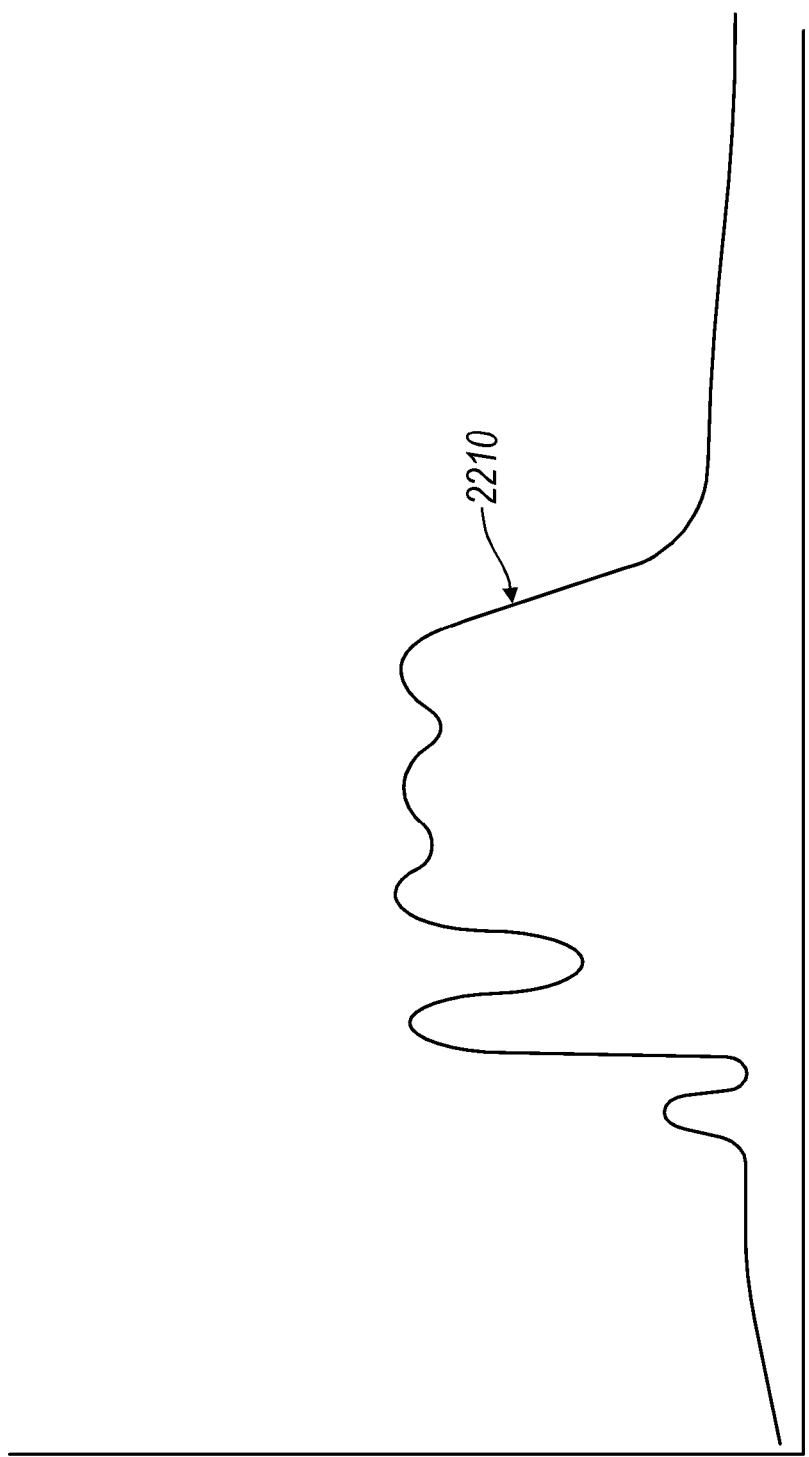
FIG. 22 is a graphical representation of the profile of the summed and normalized zone data.
Figure 23:
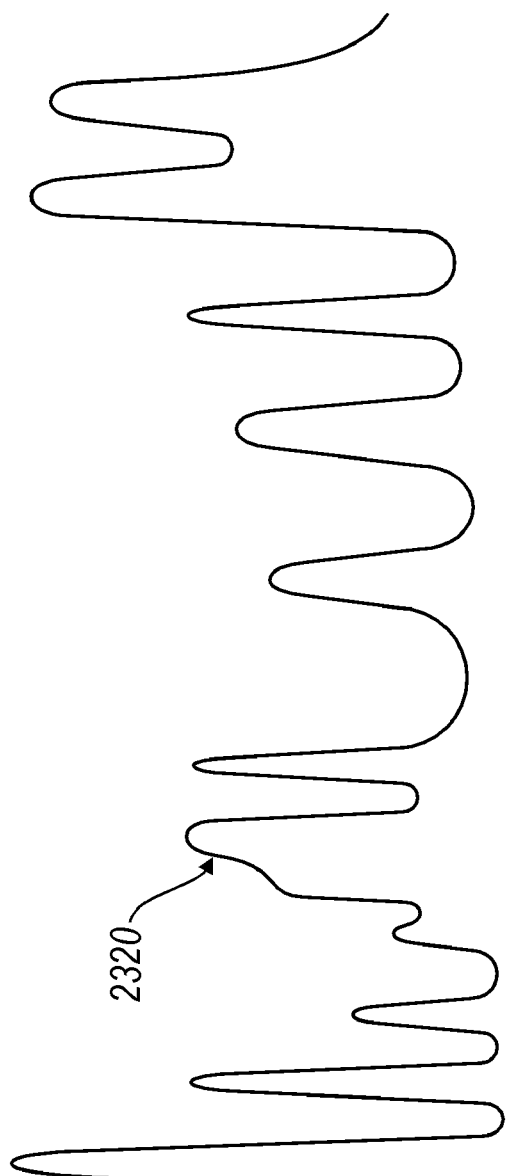
FIG. 23 is a graphical representation of the profile of the summed and normalized zone data.
Figure 24:
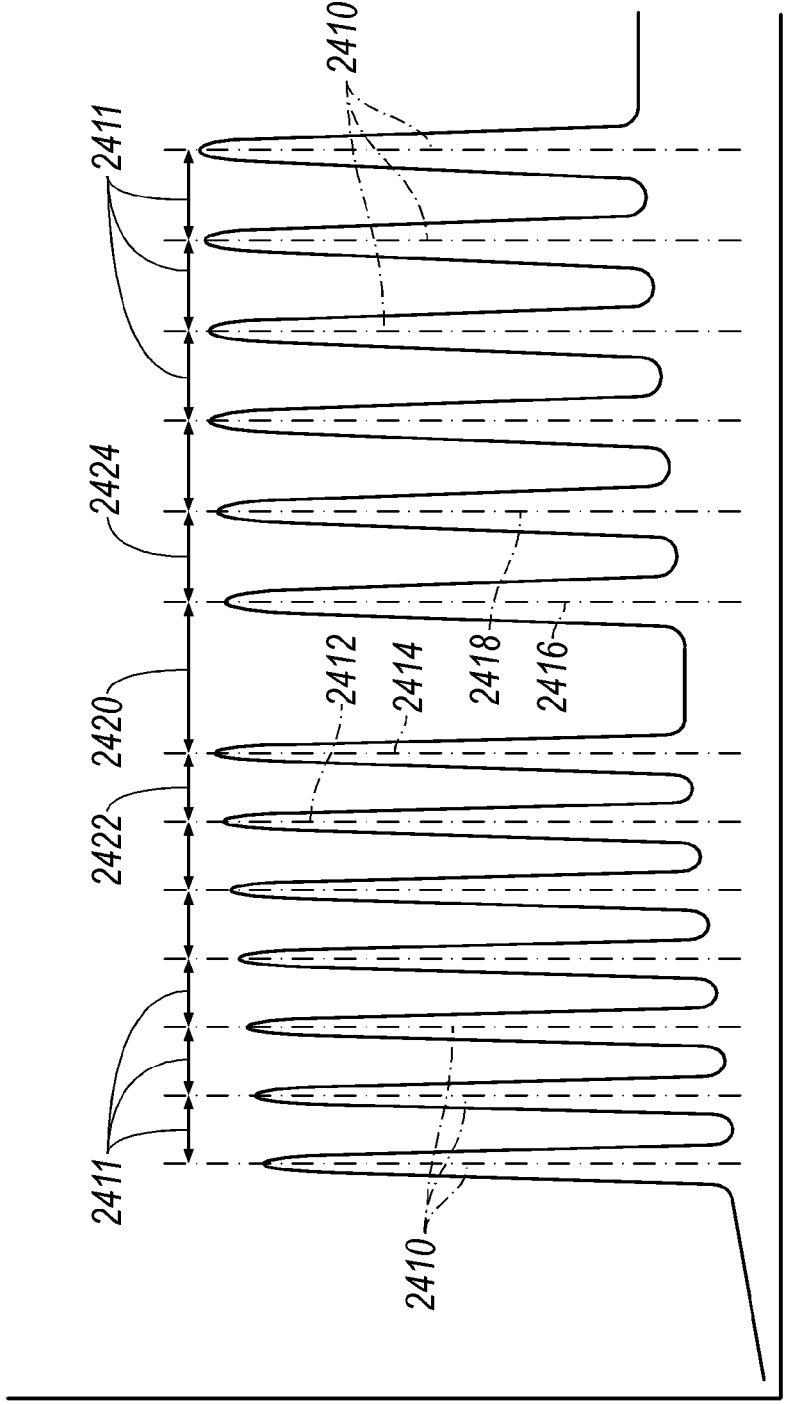
FIG. 24 is a graphical representation of the processing of the summed and normalized zone data.

In FIG. 20, zone 1914 is illustrated. As denoted by lines 2010, the pixels are summed vertically in each column thereby providing a sum of the gray scale value for each pixel for that column that is contained within the zone. The sum is then normalized, for example, by dividing the gray scale value by the number of pixels in each column for that zone. This value is then calculated for each column which may, for example, provide a profile as shown in FIG. 21. In FIG. 21, the profile 2110 illustrates the normalized gray scale value that would be produced for each column in zone 1914. The various peaks in the profile correspond to the laser lines in the image data. For example, laser line 2012 corresponds to peak 2112. Similarly, laser line 2014 corresponds to peak 2114, laser line 2016 corresponds to peak 2116, and laser line 2018 corresponds to peak 2118. Further, the gap 1820 which may act as a marker to identify the first set of lines from the second set of lines corresponds to the gap 2120 in the spacing between the peaks which can be used to identify each set of peaks corresponding to each set of laser lines. For illustrative purposes, profile 2210 is provided in FIG. 22, which corresponds to the summed and normalized column gray levels in zone 1910 of FIG. 19. Similarly, profile 2320 in FIG. 23, corresponds to the summed and normalized column gray levels in zone 1916 of FIG. 19.

Referring again to FIG. 16, columns are identified with candidate lines as denoted by block 1628. The peaks may be analyzed based on a slope analysis or thresholding technique to identify peaks that may correspond to laser lines. The center of gravity of each peak may then be calculated for each peak, as denoted by lines 2410. The center of gravity 2410 for each peak may be selected as a line candidate based on a number of parameters. For example, the height of the peak, the width of the peak, the distance between the center of gravity of one peak and the next closest peak as denoted by line 2411, as well as other geometrical factors. In addition, the controller may ignore line candidates if a specific marker does not exist within the line pattern for example, the gap 1820 between the first set of lines 1816 and the second set of lines 1818. As such, a particular pattern of distances between the center of gravity of each peak may be used to identify line candidates. For example, the distance 2422 may be identified between center of gravity 2412 of peak 2112 and center of gravity 2414 of peak 2014. In addition, a larger gap for example, twice the distance, may be identified as denoted by line 2420 between the center of gravity 2414 of peak 2014 and the center of gravity 2416 of peak 2016. Then a normal spacing may be expected to return as denoted by distance 2424 between the center of gravity 2416 of peak 2016 and center of gravity 2418 of peak 2018.

Now referring again to FIG. 16, a zone entropy value is calculated based on the entropy of column differences and various other desired filter criteria, as denoted by block 1630. The zone entropy acts as a measure of how well the pattern of peaks in the image conforms to an expected signature. The entropy may be calculated based on the distance between peaks (or more specifically, the distance between the center of gravity of peaks), and the median distance between the peaks. For example, the entropy could reflect the normalized sum of the square of the difference of the distance between the center of gravity for adjacent peaks minus the median distance between the center of gravity of each of the adjacent identified peaks. In one specific example, the zone entropy may be calculated according to the relationship:

$$\frac{\sum_{i-1 \text{ to } N}[((C_{i+1} - C_i) - C_{Avg})^2]}{N^2}$$

where $C_i$ is the position of a peak, $C_{i+1}$ is the position of a peak adjacent to $C_i$, $C_{Avg}$ is the average distance between adjacent peaks, and N is the number of peaks identified.

If additional zones are to be processed, the method follows line 1632 to block 1624, where the zone is incremented and processed according to said steps 1626, 1628, and 1630. Alternatively, when each of the zones have been processed the method follows 1634 to block 1636.

Figure 25:
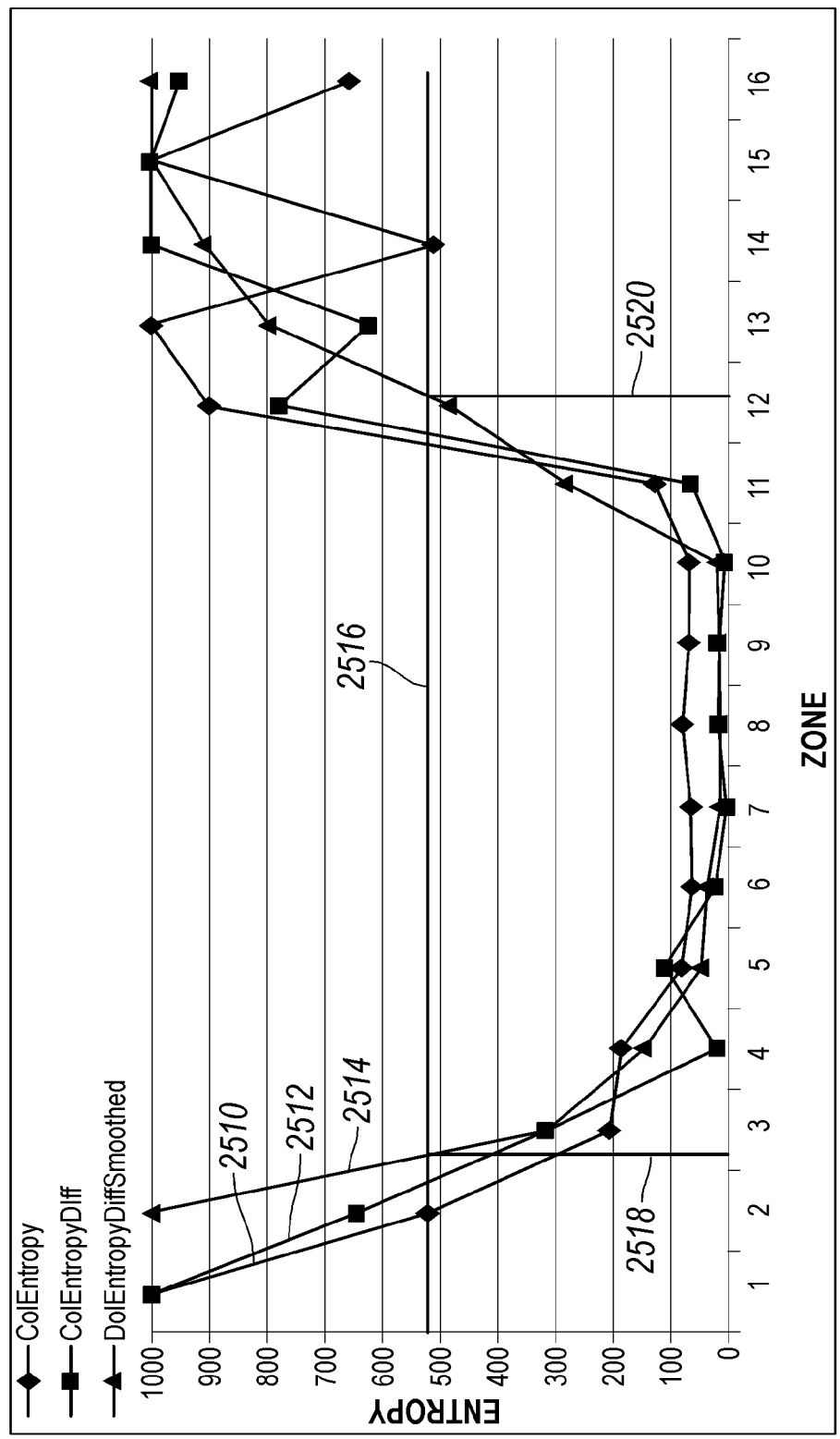
FIG. 25 is a graph of the entropy values for each zone.

A profile illustrating the zone entropy calculations is denoted by reference numeral 2510 in FIG. 25. In the sample provided in FIG. 25, it is noted that sixteen zones were used to separate the image rather than the seven zones shown in FIG. 19. However, it is understood that the number of zones may be varied based on the particular application. As described in block 1636 of FIG. 16, the zone entropy curve is differentiated as illustrated by line 2512. The zone entropy may be differentiated by simply taking the difference between adjacent zones, although other differential algorithms may be used to generate the differential profile. In block 1638, a smoothing filter is applied to the differential curve. The resulting smoothed profile is illustrated by line 2514 in FIG. 25. It is understood that various smoothing techniques may be used for example, a running average smoothing where the neighboring zones are simply averaged or a Gaussian smoothing, or other various weighted techniques of smoothing. In addition, it is also understood that various other profile processing techniques may be used instead of steps 1636 and 1638, and/or the order of various profile processing techniques may be changed based on the particular application and expected pattern.

In block 1640, a maximum threshold is calculated for the curve. The maximum threshold may be based on various factors for example, the average normalized gray scale sum of each peak, or alternatively by using various other known threshold techniques such as modal analysis or other histogram based analyses. In block 1642, the longest stretch of the curve which is below the threshold is identified. For the example shown in FIG. 25, profile 2514 is below the threshold 2516 between line 2518 in zone three and 2520 in zone twelve. A target zone is then generated based on the portion of profile 2514 that falls below the threshold 2516. The target zone may be used to identify line candidates in the image data. In one example, the lowest point on curve 2514 between line 2518 and 2520 may be used as the center for the target zone. In another example, the midpoint between line 2518 and 2520 may be used as the center for the target zone. In another example, the center of gravity in the horizontal direction may be used to determine the center of the target zone. In this particular example, the center of the target zone is calculated as zone 6.9. The value of zone 6.9 can be translated into the row of the image or a corresponding geometry in coordinate space.

Figure 26:
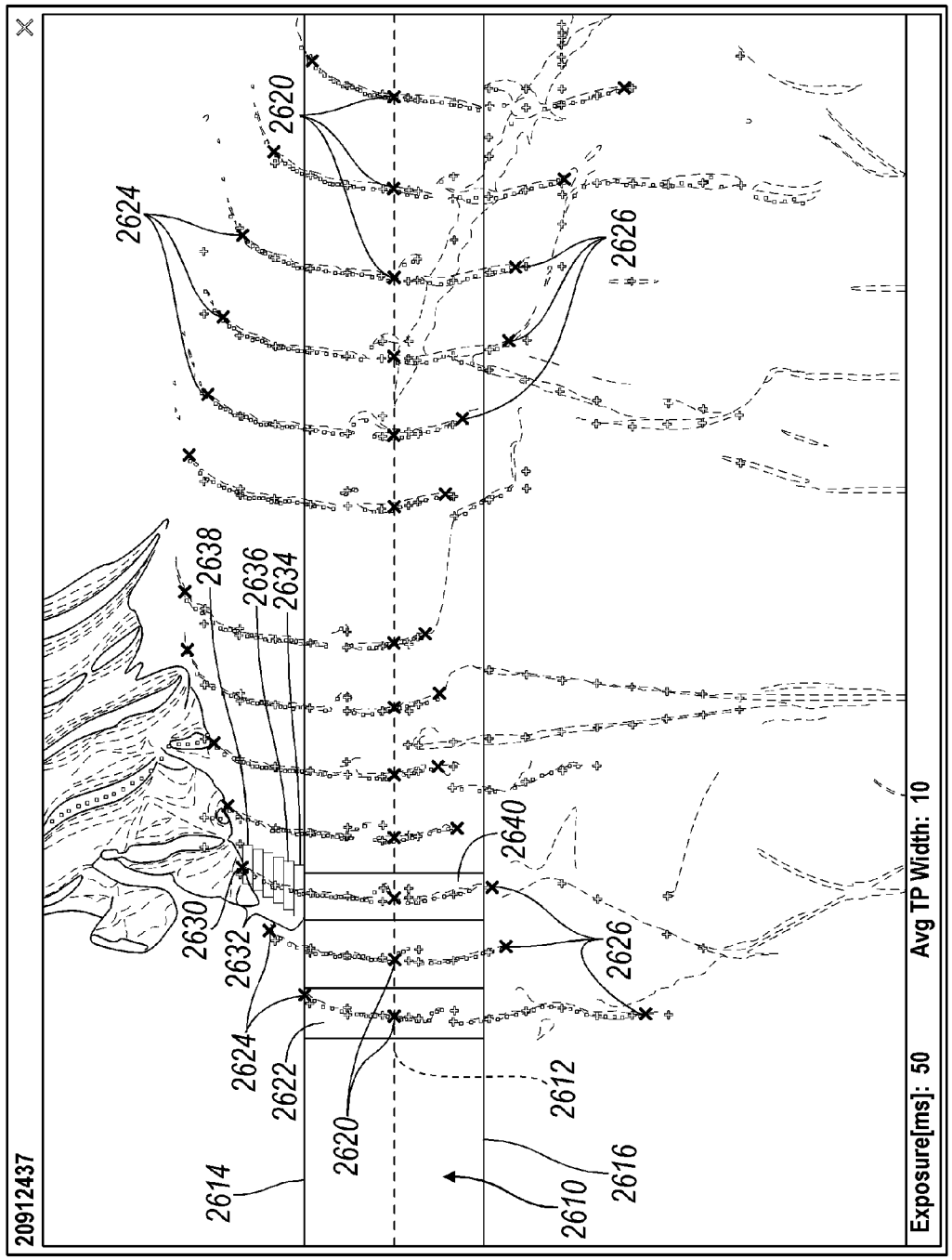
FIG. 26 is a graphical representation of the image data illustrating target zone and tracking windows.

An example of the target zone is identified as reference number 2610 in FIG. 26. The center of 2612 of the target zone 2610 is determined as described above based on the portion of the smooth profile that falls below the calculated threshold. The height of the target zone 2610 may be the same height as used in the original zones, or alternatively the target zone may be slightly larger or smaller depending on the application. In this instance, the top of the zone is denoted by line 2614 and the bottom of the zone is denoted by line 2616. The line candidates are then identified by finding center of gravity for each peak in the target zone. In one implementation the columns may be summed and normalized as described with respect to step 1626. In another implementation, the center of gravity may be found for peaks along each row and the center of gravities may be assigned to a line based on a grouping in line fitting algorithm. In either scenario, a subwindow 2622 may be used to eliminate extraneous noise in the image data. Size and placement of the window 2622 may be determined based on previous steps for example, based on the center of gravities determined in block 1626.

In block 1646, the candidate lines are grown out or tracked from the target region using the nearest neighbors using a dynamic tracking window. In some instances, the upper end point of the lines will fall within the processing window. For example, the top end point 2624 for the line within window 2622. In other instances, the end point may fall outside of the window, for example, the bottom end point 2626 that is attached to the line within window 2622. In this example, the line is tracked finding the center of gravity horizontally along the line, then moving vertically up or down, and repeating this process until an end point is found. The algorithm to find the end point may use various tracking techniques, such as line fitting and grouping techniques as well as a tracking window for eliminating center of gravities found within the window that could be caused by various noise in the image. In one example, the top end point 2630 is identified using tracking windows 2632. In this instance, the line in window 2640 extends beyond the top of the window 2640. Accordingly, a tracking window 2634 is generated which is located directly above window 2640 and may be shifted horizontally relative to window 2640 based line candidate data (e.g. center of gravity measurements). Depending on the technique used to find the center of gravity of the line as it is tracked upwardly, the window 2634 may have a height of a single row or multiple rows of pixels. If a center of gravity is found for the grayscale values in each row, the window 2634 may have a single row height. Alternatively, if the columns are summed and normalized to determine the center of gravities, the window 2634 may have a multiple row height. In either case, the center of gravities determined in window 2634 may be used to offset the subsequent window 2636 horizontally as it tracks along the line upwardly. This process continues where each window may be located directly above the previous window vertically and offset horizontally until the end point 2630 is found, for example, in window 2638. The top end points 2624 and the bottom end points 2626 may be used to generate a curved window fit to the tire surface. In one example, the top end points 2624 may then be used to determine an upper boundary of the curved window, for example, based on a curve fit of the upper end points 2624. Similarly, a bottom boundary of the curved window may be defined using a curved fit of the lower end points 2626. This information may then be provided to block 1650 where the lines may identified based on the centers of gravities and any markers.

Block 1650 may be consistent with the techniques identified above, for example with regard to identifying the line order in FIG. 13, and therefore are discussed here generally. The center of gravities may be used to eliminate false lines based on a quality factor and other criteria, as denoted by block 1652. Marker lines may be identified for example, using the ratio of the column distances to the medium column distance, as denoted in block 1654. Then each line moving out from the marker may be identified and numbered for example, based on the column distance and various other filter criteria as denoted by block 1656.

Any of the modules, controllers, servers, or engines described may be implemented in one or more general computer systems. One exemplary system is provided in FIG. 14. The computer system 1400 includes a processor 1410 for executing instructions such as those described in the methods discussed above. The instructions may be stored in a computer readable medium such as memory 1412 or a storage device 1414, for example a disk drive, CD, or DVD. The computer may include a display controller 1416 responsive to instructions to generate a textual or graphical display on a display device 1418, for example a computer monitor. In addition, the processor 1410 may communicate with a network controller 1420 to communicate data or instructions to other systems, for example other general computer systems. The network controller 1420 may communicate over Ethernet or other known protocols to distribute processing or provide remote access to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A sensor system for analyzing a feature in a sensing volume, the sensor system comprising:
   a mounting structure;
   a laser source being attached to the mounting structure and configured to project a plurality of laser lines onto the feature;
   a sensor being attached to the mounting structure and configured to image the intersection of the laser lines with the feature;
   a controller in communication with the sensor to receive image data; the image data including peaks corresponding to the intersection of the laser lines with the feature where the controller is configured to generate a dynamic window based on the entropy of the peaks, where the entropy of the peaks is calculated based on a distance between the peaks.

2. The sensor system according to claim 1, wherein the controller separates the image data into a plurality of zones.

3. The sensor system according to claim 2, wherein the sensor has a plurality of pixels organized in rows and columns, wherein the controller sums and normalizes each column of pixels in each zone to generate a profile.

4. The sensor system according to claim 3, wherein the controller identifies peaks in the profile.

5. The sensor system according to claim 4, wherein the controller calculates the center of gravity of each peak.

6. The sensor system according to claim 1, wherein the controller calculates the entropy based on the relationship:

$$\frac{\sum_{i=1 \, to \, N} [((C_{i+1} - C_i) - C_{Avg})^2]}{N^2}$$

where $C_i$ is the position of a peak, $C_{i+1}$ is the position of a peak adjacent to $C_i$, $C_{Avg}$ is the average distance between adjacent peaks, and N is the number of peaks identified.

7. The sensor system according to claim 1, wherein the controller utilizes the entropy to generate a target zone corresponding to the intersection of the laser lines with the feature.

8. The sensor system according to claim 7, wherein the controller identifies the position of lines in the target zone and tracks each laser line to find and upper endpoint and a lower endpoints of each laser line.

9. A sensor system for analyzing a feature in a sensing volume, the sensor system comprising:
a mounting structure;
a laser source being attached to the mounting structure and configured to project a plurality of laser lines onto the feature;
a sensor being attached to the mounting structure and configured to image the intersection of the laser lines with the feature;
a controller in communication with the sensor to receive image data; the image data including peaks corresponding to the intersection of the laser lines with the feature where the controller is configured to generate a dynamic window based on the entropy of the peaks;
wherein the controller calculates a distance between each adjacent peak.

10. The sensor system according to claim 9, wherein the controller calculates a zone entropy based on the distance between each adjacent peak.

11. The sensor system according to claim 10, wherein the controller calculates the zone entropy based on a difference of the distance between each adjacent peak and the average distance between each adjacent peak.

12. The sensor system according to claim 11, wherein the controller calculates the zone entropy based on a sum of squares of the difference of the distance between each adjacent peak and the average distance between each adjacent peak.

13. The sensor system according to claim 12, wherein the sum is normalized based on a total number of peaks in the zone.

14. A sensor system for analyzing a feature in a sensing volume, the sensor system comprising:
a mounting structure;
a laser source being attached to the mounting structure and configured to project a plurality of laser lines onto the feature;
a sensor being attached to the mounting structure and configured to image the intersection of the laser lines with the feature;
a controller in communication with the sensor to receive image data; the image data including peaks corresponding to the intersection of the laser lines with the feature where the controller is configured to generate a dynamic window based on the entropy of the peaks;
wherein the controller utilizes a tracking window to filter noise when tracking each laser line; the tracking window adjusting based on a previous position measurement of the laser line.

15. A method for analyzing a feature in a sensing volume, the sensor system comprising:
receiving image data from a sensor, the image data including peaks corresponding to the intersection of laser lines with the feature;
generating a dynamic window based on a distance between the peaks using a controller.

16. The method according to claim 15, wherein the controller separates the image data into a plurality of zones, the sensor having a plurality of pixels organized in rows and columns, wherein the controller sums and normalizes each column of pixels in each zone to generate a profile.

17. The sensor system according to claim 16, wherein the controller identifies peaks in the profile and calculates a distance between each adjacent peak.

18. The sensor system according to claim 17, wherein the controller calculates the zone entropy based on a sum of squares of the difference of the distance between each adjacent peak and the average distance between each adjacent peak.

19. The sensor system according to claim 15, wherein the controller calculates the entropy based on the relationship:

$$\frac{\sum_{i=1 \text{ to } N} [((C_{i+1} - C_i) - C_{Avg})^2]}{N^2}$$

where $C_i$ is the position of a peak, $C_{i+1}$ is the position of a peak adjacent to $C_i$, $C_{Avg}$ is the average distance between adjacent peaks, and N is the number of peaks identified.

20. The sensor system according to claim 15, wherein the controller utilizes the entropy to generate a target zone corresponding to the intersection of the laser lines with the feature and identifies the position of lines in the target zone, wherein the controller tracks each laser line to find and upper endpoint and a lower endpoints of each laser line, the controller utilizing a tracking window to filter noise when tracking each laser line and adjusting the tracking window based on an previous position measurement of the laser line.

* * * * *